(12) United States Patent
Saito et al.

(10) Patent No.: US 8,515,066 B2
(45) Date of Patent: Aug. 20, 2013

(54) METHOD, APPARATUS AND PROGRAM FOR ESTABLISHING ENCRYPTED COMMUNICATION CHANNEL BETWEEN APPARATUSES

(75) Inventors: Makoto Saito, Tokyo (JP); Osamu Tokunaga, Urayasu (JP); Toshiyuki Yamasaki, Boca Raton, FL (US); Shin Miyakawa, Tokyo (JP); Yasuhiro Shirasaki, Fuchu (JP); Takamasa Uchiyama, Tokyo (JP); Satoshi Fukada, Tokyo (JP); Takashi Egashira, Chiba (JP); Toshiaki Suzuki, Warabi (JP)

(73) Assignee: NTT Communications Corporation, Tokyo (JP)

( * ) Notice: Subject to any disclaimer, the term of this patent is extended or adjusted under 35 U.S.C. 154(b) by 1603 days.

(21) Appl. No.: 10/578,177

(22) PCT Filed: Nov. 4, 2004

(86) PCT No.: PCT/JP2004/016708
§ 371 (c)(1),
(2), (4) Date: Dec. 15, 2006

(87) PCT Pub. No.: WO2005/043281
PCT Pub. Date: May 12, 2005

(65) Prior Publication Data
US 2007/0133803 A1    Jun. 14, 2007

(30) Foreign Application Priority Data

| Nov. 4, 2003 | (JP) | 2003-374880 |
| Feb. 10, 2004 | (JP) | 2004-034172 |
| Feb. 13, 2004 | (JP) | 2004-037314 |

(51) Int. Cl.
| *H04K 1/00* | (2006.01) |
| *H04L 9/00* | (2006.01) |
| *H04L 29/06* | (2006.01) |
| *H04L 9/32* | (2006.01) |
| *G06F 17/00* | (2006.01) |
| *G06F 12/14* | (2006.01) |

(52) U.S. Cl.
USPC ............ 380/255; 380/262; 380/277; 380/44; 713/150; 713/153; 713/162; 713/168; 713/169; 713/171; 726/14; 726/15; 726/23

(58) Field of Classification Search
USPC ........... 380/267, 255, 262, 277, 44; 713/150, 713/153, 162, 168, 169, 171; 726/14, 15, 726/23
See application file for complete search history.

(56) References Cited

U.S. PATENT DOCUMENTS

| 6,158,011 | A | 12/2000 | Chen et al. | |
| 6,366,950 | B1 | 4/2002 | Scheussler et al. | |
| 7,418,591 | B2 * | 8/2008 | Tachikawa | 713/155 |
| 2002/0174335 | A1 | 11/2002 | Zhang et al. | |
| 2003/0084287 | A1 * | 5/2003 | Wang et al. | 713/168 |
| 2004/0228352 | A1 * | 11/2004 | Constantinof | 370/395.21 |
| 2006/0143693 | A1 | 6/2006 | Glickman | |
| 2009/0006850 | A1 * | 1/2009 | Birger et al. | 713/169 |

FOREIGN PATENT DOCUMENTS

| JP | 5-191402 | 7/1993 |
| JP | 2000-244655 | 9/2000 |
| JP | 2001-177663 | 6/2001 |
| JP | 2002-208921 | 7/2002 |
| JP | 2003-163661 | 6/2003 |
| JP | 2004-64215 | 2/2004 |
| WO | WO 01/18772 A1 | 3/2001 |
| WO | 01/58113 | 8/2001 |
| WO | WO 2006/104459 A1 | 10/2006 |
| WO | WO 2006/134226 A1 | 12/2006 |

OTHER PUBLICATIONS

Kumiko Ono, et al., "End-to-End Secure Communication with SIP Signaling", The Institute of Electronics, Information and Communication Engineers, vol. 102, No. 693, Mar. 6, 2003, 12 pages (with English translation of selected chapters). Stainov, Von Rumen, "Datensicherheit im Internet: Prinzipien, Moeglichkeiten und Grenzen", ntz, vol. 49, No. 8, pp. 32-34, 36, 1996.

Hoogenboom, Mark et al., "Security for Remote Access and Mobile Applications", Computers & Security, vol. 19, No. 2, pp. 149-163, 2000.

* cited by examiner

*Primary Examiner* — Aravind Moorthy
(74) *Attorney, Agent, or Firm* — Oblon, Spivak, McClelland, Maier & Neustadt, L.L.P.

(57) ABSTRACT

A method for establishing an encrypted communication channel between a first apparatus and a second apparatus by using a session management apparatus. The method includes: establishing a first encrypted communication channel between the session management apparatus and the first apparatus by performing mutual authentication between the session management apparatus and the first apparatus; establishing a second encrypted communication channel between the session management apparatus and the second apparatus by performing mutual authentication between the session management apparatus and the second apparatus; and exchanging key information between the first apparatus and the second apparatus via the first encrypted communication channel and the second encrypted communication channel so as to establish an encrypted communication channel between the first apparatus and the second apparatus.

16 Claims, 21 Drawing Sheets

FIG.20

| USER IDENTIFIER | NAME OF ACCESS DESTINATION |
|---|---|
| × × × | AAA,BBB,CCC,····· |
| ⋮ | ⋮ |

METHOD, APPARATUS AND PROGRAM FOR ESTABLISHING ENCRYPTED COMMUNICATION CHANNEL BETWEEN APPARATUSES

TECHNICAL FIELD

The present invention relates to techniques for establishing a secure data channel between two terminals over a network.

BACKGROUND ART

In conventional technologies, in order to establish a data channel between two terminals over an IP network to perform so-called peer-to-peer communications, various preparation activities are necessary such as name registration to DNS, setting and management of FW (fire wall) for ensuring security, obtaining public-key certificates and the like. For a terminal to perform encrypted peer-to-peer communications with many terminals through mutual authentication, it is necessary for the terminal to obtain public-key certificates of all other terminals or IDs and passwords of all other terminals.

As mentioned above, according to the conventional technologies, complicated activities are necessary to establish a secure data channel between two terminals over an IP network. In addition to that, since names and addresses of terminals are to be registered in an open DNS, there is a problem in that unauthorized access may occur and that data in the open DNS may be tampered with.

A mechanism for establishing a pseudo peer-to-peer data channel between two terminals is proposed. In the mechanism, a mediating server is introduced between the terminals. The mediating server terminates a data channel from a terminal at one endpoint as a proxy and terminates a data channel from a terminal at another endpoint, and connects the data channels. However, according to this method, since all data exchanged between the terminals pass through the mediating server, there is a problem in that a heavy work load is placed on the mediating server. In addition, there is a problem in that real-time access to a home terminal cannot be realized by the mechanism. Japanese Laid-Open Patent Application No. 2002-208921 discloses a technology related to establishing a secure channel.

DISCLOSURE OF THE INVENTION

An object of the present invention is to provide technologies for easily establishing a secure data channel between apparatuses.

The object is achieved by a method for establishing an encrypted communication channel between a first apparatus and a second apparatus by using a session management apparatus, including the steps of:

establishing a first encrypted communication channel between the session management apparatus and the first apparatus by performing mutual authentication between the session management apparatus and the first apparatus;

establishing a second encrypted communication channel between the session management apparatus and the second apparatus by performing mutual authentication between the session management apparatus and the second apparatus; and exchanging key information between the first apparatus and the second apparatus via the first encrypted communication channel and the second encrypted communication channel so as to establish an encrypted communication channel between the first apparatus and the second apparatus.

According to the present invention, a relationship of mutual trust can be established between each apparatus and the session management apparatus by performing mutual authentication. Thus, an encrypted communication channel between the first apparatus and the second apparatus can be established by a simple signaling procedure via the session management apparatus, so that a secure data channel between apparatuses can be easily established. In addition, data communications between the apparatuses can be performed without the session management apparatus after the encrypted data channel is established. Therefore, problems of the conventional technology can be solved.

The present invention can also be configured as a method for establishing an encrypted communication channel between a first apparatus and a second apparatus by using a session management apparatus, wherein:

the session management apparatus and the first apparatus exchange key information for encrypted communication, and perform mutual authentication so as to establish a first encrypted communication channel between the session management apparatus and the first apparatus;

the session management apparatus and the second apparatus exchange key information for encrypted communication, and perform mutual authentication so as to establish a second encrypted communication channel between the session management apparatus and the second apparatus;

the first apparatus sends, to the session management apparatus via the first encrypted communication channel, a connection request message destined for the second apparatus including key information used for encrypted communication between the first apparatus and the second apparatus, and the session management apparatus sends the connection request message to the second apparatus via the second encrypted communication channel; and the second apparatus sends, to the session management apparatus via the second encrypted communication channel, a response message including key information used for encrypted communication between the first apparatus and the second apparatus in response to receiving the connection request message, and the session management apparatus sends the response message to the first apparatus via the first encrypted communication channel.

The object is also achieved by a method for establishing an encrypted communication channel between a first apparatus and a second apparatus, wherein:

a public-key management apparatus and the first apparatus exchange key information used for encrypted communication, and the public-key management apparatus and the first apparatus perform mutual authentication so that a first encrypted communication channel is established;

the first apparatus generates a secret key and a public-key, and sends the public-key to the public-key management apparatus via the first encrypted communication channel;

the public-key management apparatus generates a public-key certificate for the received public-key, and sends the public-key certificate to the first apparatus via the first encrypted communication channel; and the first apparatus sends the public-key certificate to the second apparatus so that a second encrypted communication channel using the public-key between the first apparatus and the second apparatus is established.

The present invention can be also configured as a method for establishing an encrypted communication channel between a first apparatus and a second apparatus, wherein:

a public-key management apparatus and the first apparatus exchange key information used for performing encrypted communication, and the public-key management apparatus and the first apparatus perform mutual authentication so that a first encrypted communication channel is established;

the public-key management apparatus and the second apparatus exchange key information used for encrypted communication, and the public-key management apparatus and the second apparatus perform mutual authentication so that a second encrypted communication channel is established;

the first apparatus generates a secret key and a public-key, and sends the public-key to the public-key management apparatus via the first encrypted communication channel;

the public-key management apparatus stores the received public-key in its storage device, and the second apparatus obtains the public-key from the public-key management apparatus via the second encrypted communication channel so that a third encrypted communication channel using the public-key between the first apparatus and the second apparatus is established.

The above object is also achieved by a method for transferring a message among a first apparatus, a session management apparatus and a second apparatus each connected to a network, wherein:

the session management apparatus and the first apparatus perform mutual authentication to establish a first encrypted communication channel between the session management apparatus and the first apparatus, and the session management apparatus stores a name of the first apparatus and identification information of the first encrypted communication channel in a storage device wherein the name of the first apparatus and the identification information are associated with each other;

the session management apparatus and the second apparatus perform mutual communication to establish a second communication channel between the session management apparatus and the second apparatus;

the first apparatus sends a message including a name of the first apparatus via the first encrypted communication channel to the session management apparatus;

the session management apparatus determines whether the name included in the message is correct by comparing the name included in the message with the name that is stored in the storage device and that is associated with the identification information of the first encrypted communication channel; and the session management apparatus sends the message to the second apparatus via the second encrypted communication channel.

According to the present invention, imposture by an apparatus can be avoided so that a signaling message can be transferred securely. As a result, a secure data channel can be established.

The object is also achieved by a method for transferring a message among a first apparatus, a session management apparatus and a second apparatus each connected to a network, wherein:

the session management apparatus and the first apparatus perform mutual authentication to establish a first encrypted communication channel between the session management apparatus and the first apparatus;

the session management apparatus and the second apparatus perform mutual communication to establish a second communication channel between the session management apparatus and the second apparatus;

the first apparatus sends, to the session management apparatus via the first encrypted communication channel, a message including a first header indicating reliability of a route between the first apparatus and the session management apparatus; and the session management apparatus adds a second header indicating reliability of a route between the session management-apparatus and the second apparatus to the message, and sends the message to the second apparatus via the second encrypted communication channel.

According to the present invention, since a header that indicates reliability of a route is included in the message, reliability of routes can be checked. As a result, reliability of a message can be checked, so that a signaling message can be transferred securely. As a result, a secure data channel can be established.

BRIEF DESCRIPTION OF THE DRAWINGS

Other objects, features and advantages of the present invention will become more apparent from the following detailed description when read in conjunction with the accompanying drawings, in which:

FIG. 20 shows a table including each user identifier and corresponding permitted access destination names;

PREFERRED EMBODIMENTS FOR CARRYING OUT THE INVENTION

In the following, embodiments of the present invention are described with reference to figures.

(First Embodiment)

First, outlines of a first embodiment of the present invention are described with reference to FIG. 1.

Figure 1:
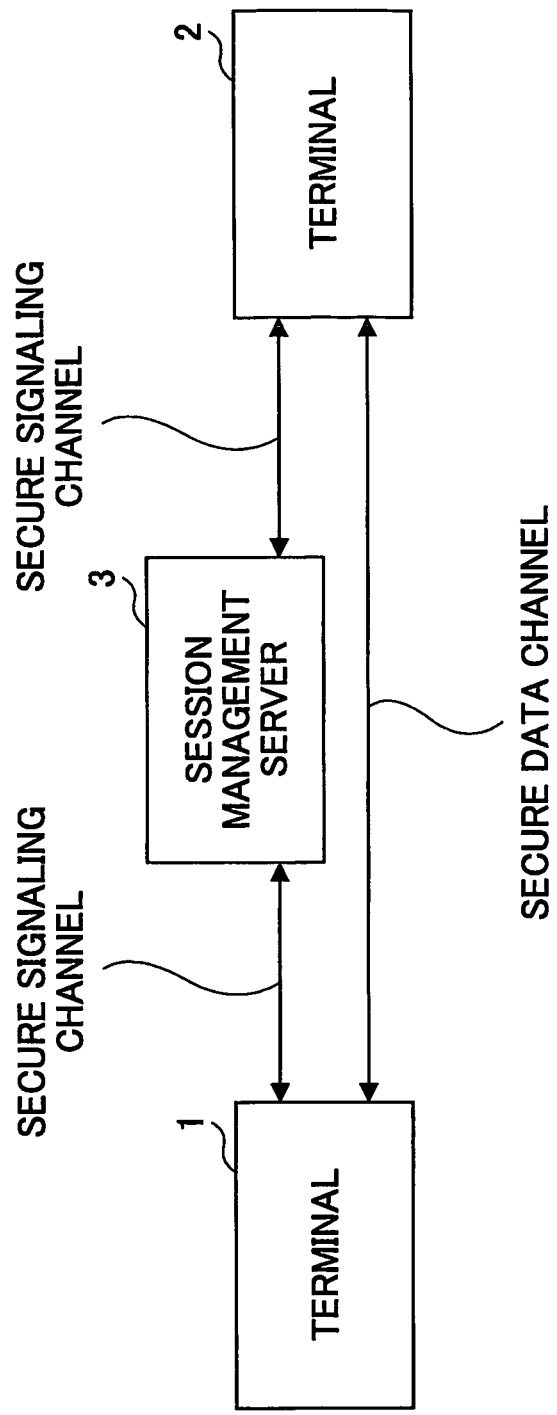
FIG. 1 is a diagram for explaining an outline of a first embodiment of the present invention.

As shown in FIG. 1, a session management server 3 is provided between a terminal 1 and a terminal 2. Among terminal 1-session management server 3-terminal 2, a signaling procedure is performed for constructing a data channel between the terminal 1 and the terminal 2. After the data channel is established, data communications are performed between the terminals 1 and 2 without the session management server 3. Although "terminal" is used as a term indicating an apparatus that establishes an encrypted communication channel with another apparatus in embodiments of this application, the term "terminal" can be replaced by "apparatus" in this application.

In the signaling procedure, encryption key information is exchanged and mutual authentication is performed between the terminal 1 and the session management server 3 and between the session management server 3 and the terminal 2 to establish secure signaling channels using, IPsec and the like. Then, for establishing a secure data channel between the terminal 1 and the terminal 2, name registration at the session management server is performed and signaling steps are performed via the secure signaling channels established between the terminal 1 and the session management server 3 and between the session management server 3 and the terminal 2.

By performing the signaling procedure for establishing the secure signaling channels between the terminal 1 and the session management server 3 and between the session management server 3 and the terminal 2, a relationship of mutual trust based on mutual authentication is established in each of the pair of the session management server 3 and the terminal 1 and the pair of the session management server 3 and the terminal 2. As a result, a relationship of mutual trust is also established between the terminal 1 and the terminal 2. That is, by performing the mutual authentication for each of the pairs, a chain of trust is established via the session management server 3. Therefore, a simplified procedure can be used for exchanging key information for establishing the secure data channel between the terminal 1 and the terminal 2.

Next, a communication sequence among terminal 1-session management server 3-terminal 2 is described with reference to FIG. 2.

Figure 2:
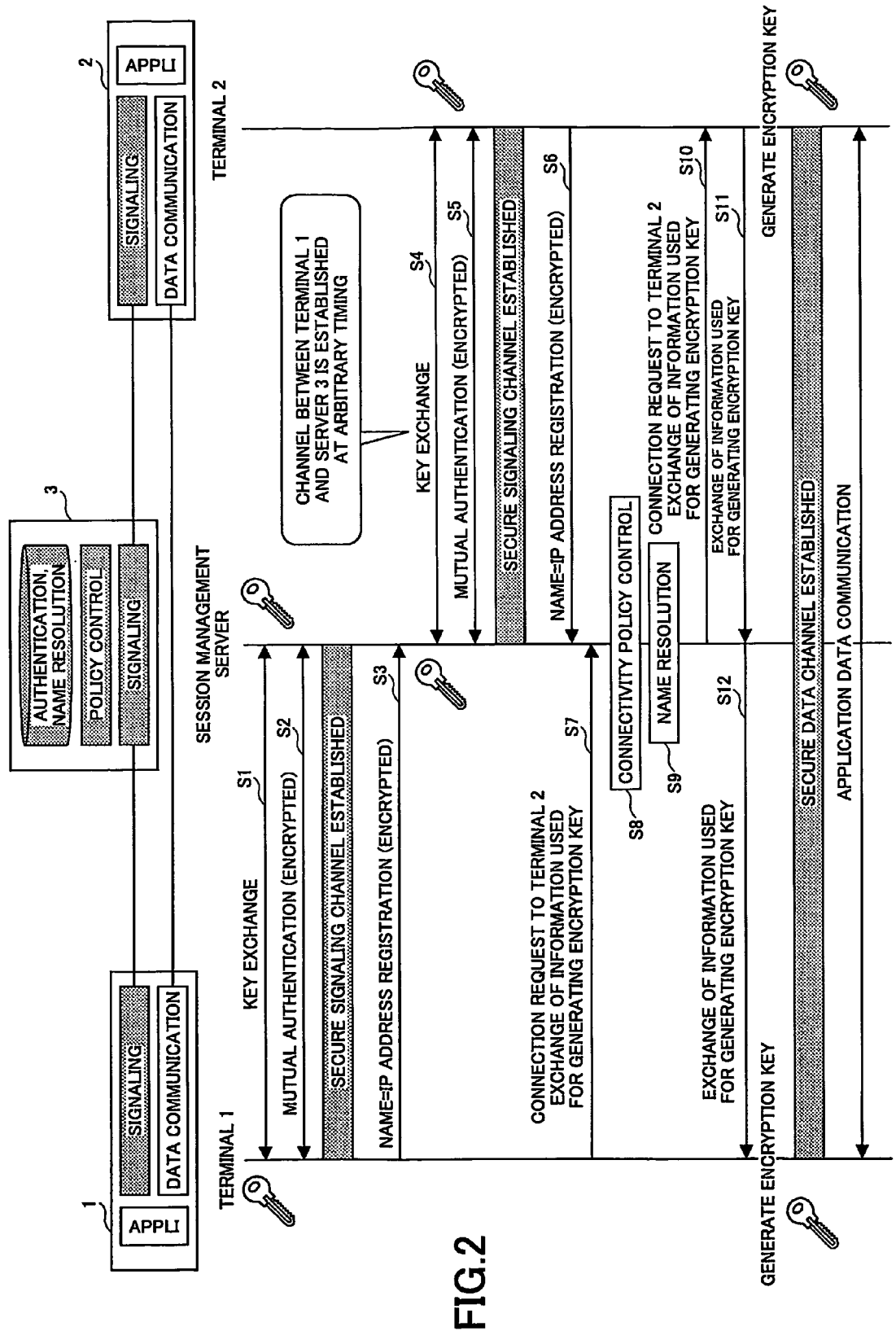
FIG. 2 is a sequence diagram showing communication sequence among terminal 1-session management server 3-terminal 2.

The sequence shown in FIG. 2 is predicated on a system configuration in which the terminal 1, the session management server 3 and the terminal 2 are respectively connected to an IP network such as the Internet.

Each terminal includes a signaling function for executing a signaling procedure with the session management server 3, a function for performing data communications via the secure data channel with a terminal at the other endpoint, and an application for providing a desired service utilizing the data communications capability.

The session management server includes a signaling function for executing signaling procedures with each terminal, a connection policy control function for controlling connectivity permission information between terminals, an authentication function for authenticating each terminal, a name resolution function for obtaining an IP address of a terminal from a name of the terminal, and a database that stores names and corresponding IP addresses. In addition, the session management server may include a function similar to a general DNS as a name resolution function.

As shown in FIG. 2, for establishing a secure data channel between the terminal 1 and the terminal 2, first, a secure signaling channel is established in each of the pair of the terminal 1 and the session management server 3 and the pair of the session management server 3 and the terminal 2, then name registration is performed at the session management server 3 for each terminal.

More specifically, key information (information for generating an encryption key) used for encrypted communication such as IPsec is exchanged between the terminal 1 and the session management server 3 in step 1. After that, each of the terminal 1 and the session management server 3 encrypts information including its own password and ID and sends the information to the other party, so that mutual authentication is performed in step 2, so that a secure signaling channel is established between the terminal 1 and the session management server 3. By using the secure signaling channel, the terminal 1 sends its name and IP address to the session management server 3, and the session management server 3 registers the name and the IP address in step 3. Similar procedures are executed between the terminal 2 and the session management server 3, so that the session management server 3 registers the name and the IP address of the terminal 2 in steps 4-6.

After that, a connection request from the terminal 1 to the terminal 2 is sent from the terminal 1 via the secure signaling channel in step 7. The connection request includes the name of the terminal 2 and key information (information for generating encryption key) for encrypted communication between the terminal 1 and the terminal 2. The session management server 3 that receives the connection request checks whether the terminal 1 has committed fraud (originator imposture check). Further, the session management server 3 checks whether terminal 1 is permitted to connect to the terminal 2 by using the connectivity policy control function in step 8. When the connection is permitted, the session management server 3 obtains the IP address of the terminal 2 from the name of the terminal 2 by referring to the database by using the name resolution function in step 9, and transfers the connection request to the terminal 2 via the secure signaling channel between the session management server 3 and the terminal 2 in step 10. At this time, the IP address of the terminal 1 is also sent to the terminal 2. If the connection between the terminal 1 and the terminal 2 is not permitted, the connection request from the terminal 1 is rejected. In this case, any information on the terminal 2 is not sent to the terminal 1. The originator imposture check is described in detail below.

The terminal 2 that receives the connection request sends a response message that includes key information for encrypted communication to the session management server 3 via the secure signaling channel between the terminal 2 and the session management server 3 as a response to the connection request in step 11. The session management server 3 transfers the response message to the terminal 1 in step 12. At this time, the IP address of the terminal 2 is sent to the terminal 1.

After these steps are performed, encrypted communication can be performed between the terminal 1 and the terminal 2. That is, a secure data channel is established between the terminal 1 and the terminal 2 and desired data communications can be performed via the secure data channel.

The fact that the secure signaling channel has been established through the steps 1 and 2, and 4 and 5 means that mutual authentication has been successfully done between each terminal and the session management server 3 so that a relationship of mutual trust has been constituted in each of the pair of the terminal 1 and the session management server 3 and the pair of the terminal 2 and the session management server 3. Since such relationship exists in each pair, a relationship of mutual trust also exists between the terminal 1 and the terminal 2. Therefore, after the step 7, a more simplified procedure can be used compared to a key exchange procedure used for conventional encrypted communications.

For realizing the above-mentioned procedure, an extended SIP (Session Initiation Protocol) can be used. In this case, the session management server 3 functions as a SIP proxy server, and information exchanged in the above-mentioned procedure is included in SIP messages.

In this case, a REGISTER message can be used for establishing the secure signaling channel and for performing name registration, and an INVITE message can be used for establishing a secure data channel between the terminal 1 and the terminal 2.

Figure 3:
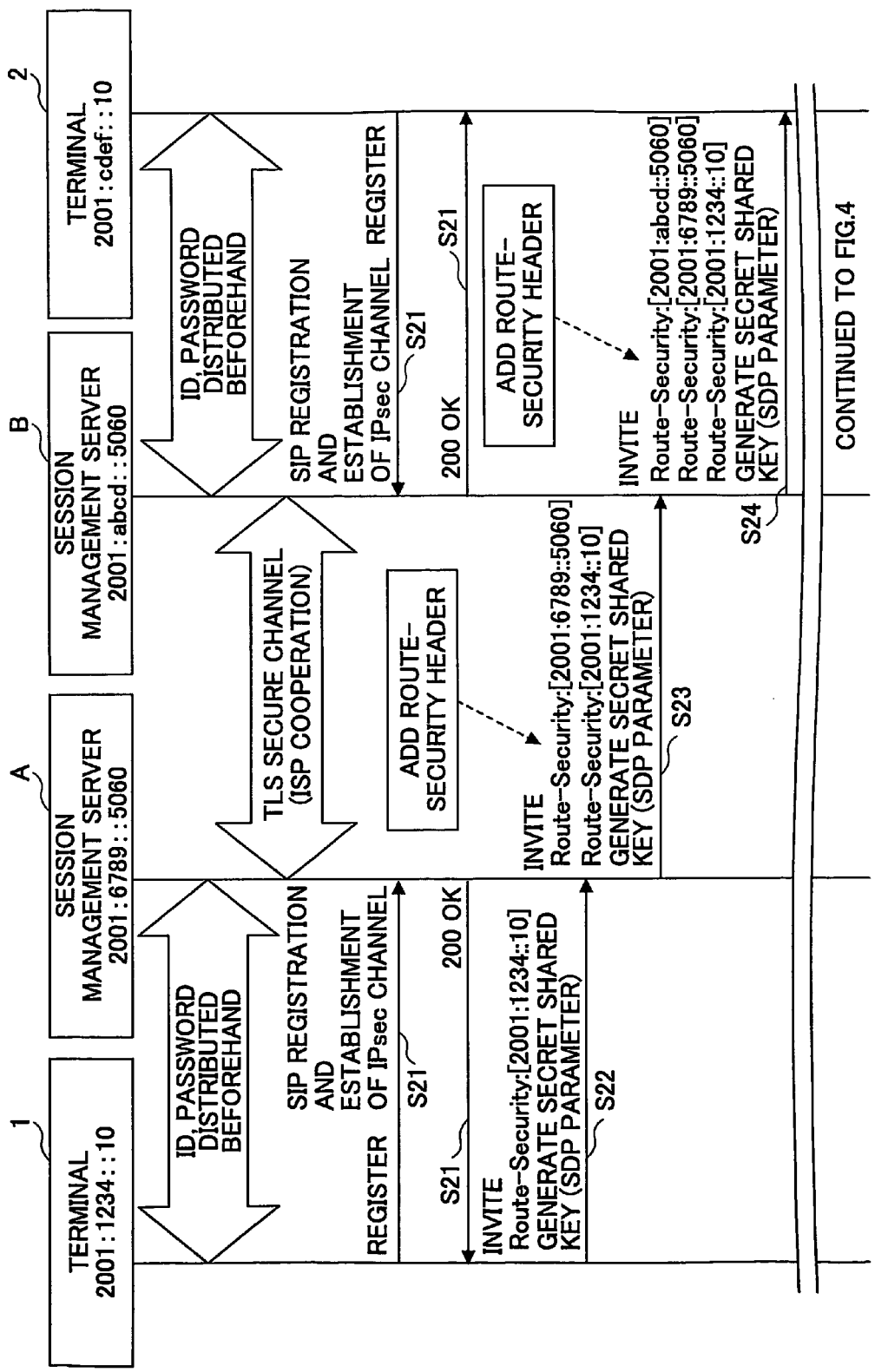
FIG. 3 shows a concrete example of the sequence.
Figure 4:
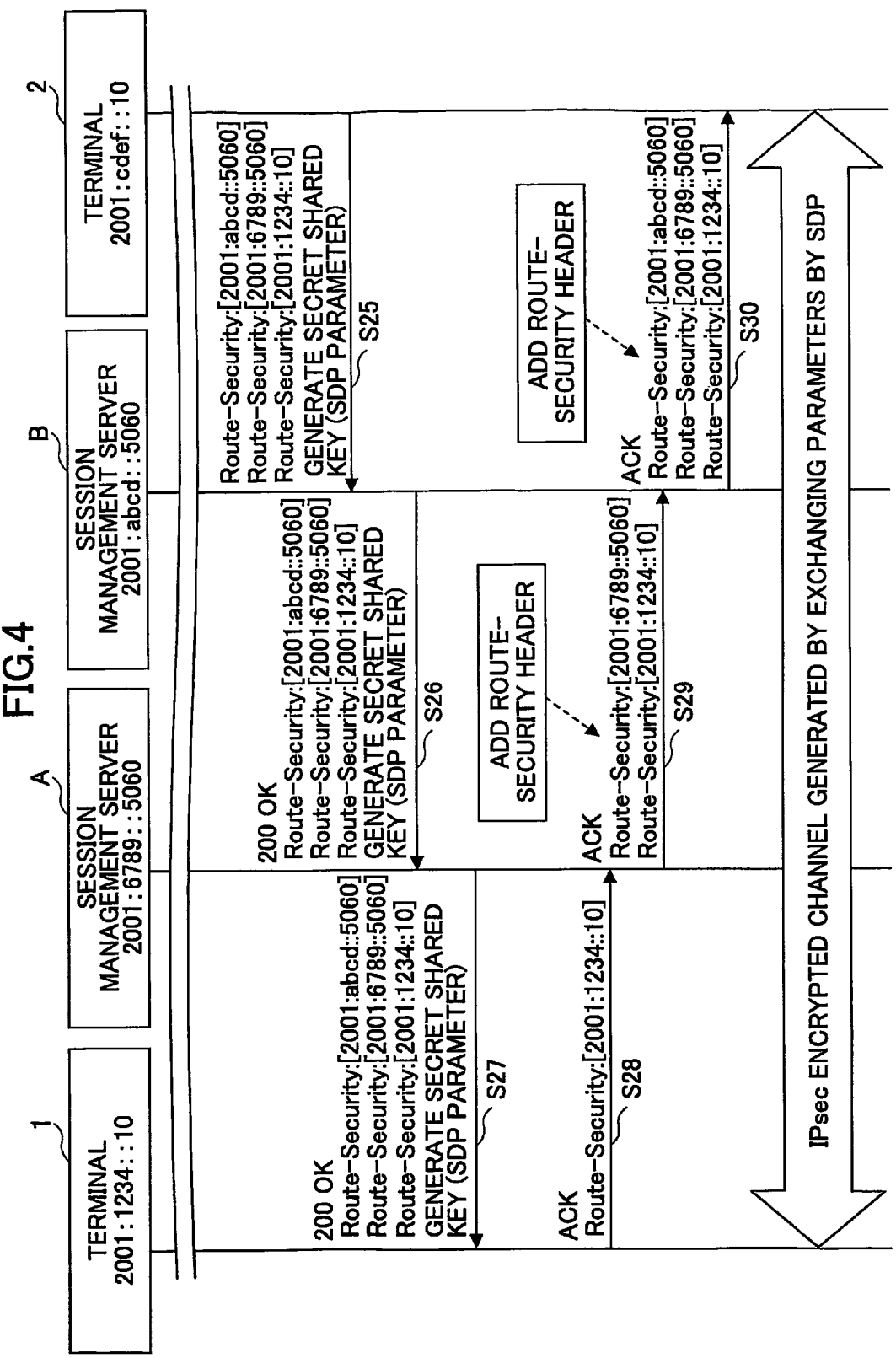
FIG. 4 shows a concrete example of the sequence.

FIGS. 3 and 4 show a sequence example in the case where SIP is used.

FIGS. 3 and 4 show an example in which multiple session management servers that are connected to each other via secure channels are provided. The session management server or session management servers connected via secure channels may be called a session management apparatus. In the configuration shown in FIGS. 3 and 4, the IP address of the terminal 1 is 2001:1234::10, the IP address of the session management server A is 2001:6789::5060, the IP address of the session management server B is 2001:abcd::5060, and the IP address of the terminal 2 is 2001:cdef::10.

Between a terminal and a session management server adjacent to the terminal, an ID and a password are exchanged. That is, the terminal has an ID and a password of the session management server in its own storage device, and the session management server has an ID and a password of the terminal in its own storage device. Between the session management server A and the session management server B, communications are performed via a secure channel such as a TLS (Transport Layer Security) channel and the like.

First, each of the terminals 1 and 2 establishes a secure channel to the corresponding session management server (A or B), and sends (conforming to SIP) a name and an IP address of the terminal to the session management server (A or B) in step 21 (corresponding to steps 1-6 in FIG. 2). This procedure is described in more detail below.

Next, the terminal 1 sends an INVITE message via a secure signaling channel between the terminal 1 and the session management server A as a connection request to the terminal 2 in step 22. In the step 22, the INVITE message includes key information for encrypted communication (information for generating a secret shared key in this case) as a SDP parameter. The session management server A transfers the INVITE message to the session management server B via a secure channel between the session management server A and the session management server B in step 23.

The INVITE message from the terminal 1 includes a Route-Security header. An apparatus that receives an INVITE message including a Route-Security header checks whether a route from an address in the Route-Security header ("Route-Security: [address]") to the apparatus is secure (for example, checks whether encryption by IPsec is performed). If the route is determined to be secure, the apparatus transfers the INVITE message in which the Route-Security header remains as it is to a next node. If it is necessary that the next node checks whether a route from which a message is received is secure, the apparatus adds "Route-Security: [own address]" to the INVITE message and transfers the INVITE message. A response message returned from a destination includes Route-Security headers added while the INVITE message is being transferred to the destination. Accordingly, each apparatus that receives the response message can recognize that the message has been transferred via secure routes.

That is, the Route-Security header provides a mechanism for ensuring security of routes. Route security check methods using the Route-Security header are described in detail below.

The session management server B sends the INVITE message to the terminal 2 via the secure signaling channel between the terminal 2 and the session management server B in step 24. In the session management server A and the session management server B, name resolution for the terminal 2 has been performed.

The terminal 2 that receives the INVITE message sends a response massage that includes key information for encrypted communication to the terminal 1 in step 25. Then, the response message is routed through the same routes as the INVITE message in the reverse direction to the terminal 1 in steps 26 and 27.

After that, an acknowledgment (ACK) message is sent from the terminal 1 to the terminal 2 in steps 28-30. As a result, encrypted communications (IPsec, for example) can be performed between the terminal 1 and the terminal 2.

Figure 5:
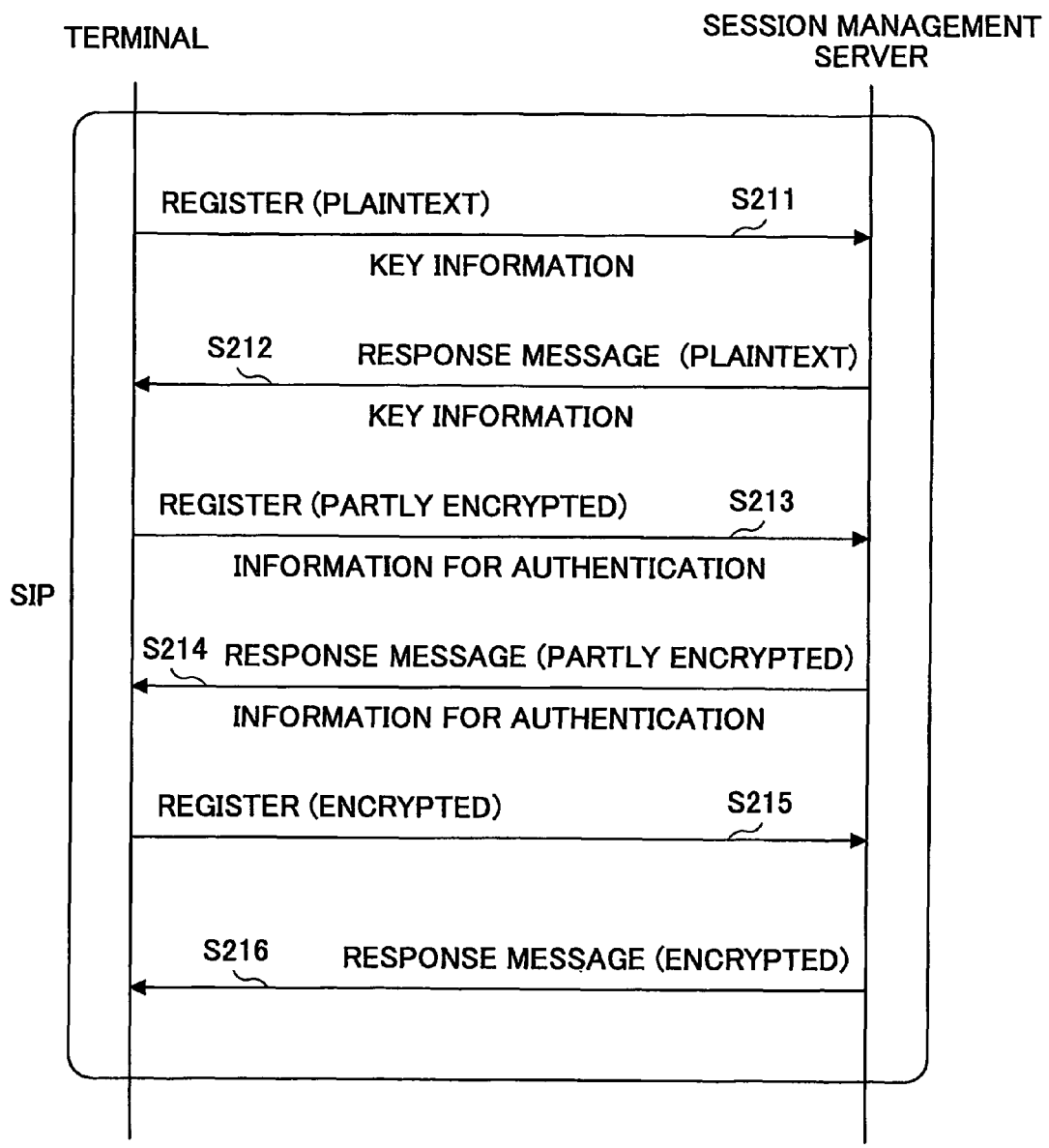
FIG. 5 is a sequence diagram of REGISTER messages.

The sequence of the REGISTER message in step 21 in FIG. 3 is one shown in FIG. 5, for example.

First, the terminal sends a REGISTER message including key information for encrypted communication (IPsec and the like) to the session management server in step 211. In response to the REGISTER message, the session management server returns a response message including key information for encrypted communication in step 212. After that, the terminal sends a REGISTER message including authentication information used by the session management server to authenticate the terminal to the session management server in step 213. In response to the REGISTER message, the session management server sends a RESPONSE message including authentication information used by the terminal to authenticate the session management server to the terminal in step 214. After mutual authentication is accomplished, encrypted communication can be performed via the secure signaling channel.

After that, since packets are encrypted and are transmitted and received via the secure signaling channel, name registration can be conducted by using a general REGISTER message sequence in steps 215 and 216.

In the above-mentioned sequence, it is assumed that other information items necessary for performing encrypted communication are received and sent as necessary. The authentication information may be information including ID and password, or may be a certificate (X.509 certificate and the like). In addition, the authentication information may be included in the message used for exchanging the key information for encrypted communication.

(Originator imposture monitoring, Route reliability check)

In the following, originator imposture monitoring and route reliability check are described in more detail.

In the sequence of FIGS. 3 and 4, the session management server performs above-mentioned originator imposture monitoring, and adds above-mentioned Route-Security header to perform the signaling procedure by the INVITE message securely in the secure data channel structuring procedure.

In the following, the Route-Security header is described in detail. As mentioned above, the Route-Security header is a header added in a terminal (SIP UA) or in a session management server (SIP proxy). The Route-Security header includes at least an address of the apparatus that adds the Route-Security header. The Route-Security header is added when it is necessary for a destination node to determine whether a link used for sending a request message to the destination node is secure. In addition, the Route-Security header may be added when security of a link to be used for sending the request message is higher than a predetermined level.

The Route-Security header may include a "security level" parameter indicating security level of a link to be used for sending a request massage to a next node. For example, a parameter in positions 0 to 3 can be added according to whether user authentication (identity check) is performed, whether completeness is ensured ("completeness" means that a received packet has not been tampered with), and whether secrecy is maintained (in other words, whether information in the packet is encrypted). A node that receives a message with the security level compares an IP address in the Route-Security header and an IP address of a previous node that sent the message so as to determine whether the Route-Security header is properly added. In addition, the node can determine whether the parameter is valid by checking whether the security level indicated by the Route-Security header is the same as the security level of a link via which the node receives the message. If the IP address in the Route-Security header does not agree with the IP address of the previous node, the node determines that the Route-Security header is not added in the previous node. In this case, the node may add a Route-Security header without any security level parameter by using the IP address of the previous node. Accordingly, a terminal that receives the message can know that there is a link in which the Route-Security header is not added.

A terminal that receives a request message that has passed through one or more session management servers refers to Route-Security headers added to the request message. As a result, for example, if there is a link in which a Route-Security header is not added, the terminal can determine that there is a possibility that the request message has passed through a link that does not have enough security. In addition, if a Route-Security header including a parameter indicating a low security level is included in the request message, the terminal can determine that the request message has passed through a low security link. In this case, the terminal may return an error response, for example.

In a case where the request message is transferred to a destination terminal via secure signaling channels based on mutual authentication, each node may just check whether a previous node has properly added the Route-Security header (for example, just check the IP address of the previous node). That is, a terminal that receives a request message to which a series of Route-Security headers have been added can determine the security of the route via which the request message has been transferred just by checking a Route-Security header added by a previous node. In this case, for example, if the terminal detects that a proper Route-Security header is not added in the previous node, the terminal returns an error to a source terminal, for example. The examples in FIGS. 6-8 below shows this case.

The terminal that receives the request message includes Route-Security headers, which were included in the received request message, in a response message wherein the order of the Route-Security headers are maintained. The response message is sent to a source terminal via a route the same as the one used for transferring the request message. Each session management server, for example, can check the response massage by comparing the IP address included in a Route-Security header added by the session management server with the IP address of the session management server itself.

A terminal that is a sending source of the request message can check reliability of the response message by checking the series of the Route-Security headers in the same way as the terminal that receives the request message. For example, if the terminal determines that reliability of a link is low, the terminal may stop the session.

In a case where the response message is transferred to the terminal via secure signaling channels based on mutual authentication, the terminal may just check a Route-Security header that includes the IP address of the terminal itself.

Next, processes of steps 22-27 in the sequence shown in FIGS. 3 and 4 are described in more detail for describing originator imposture monitoring and for describing a usage example of the Route-Security header.

Figure 6:
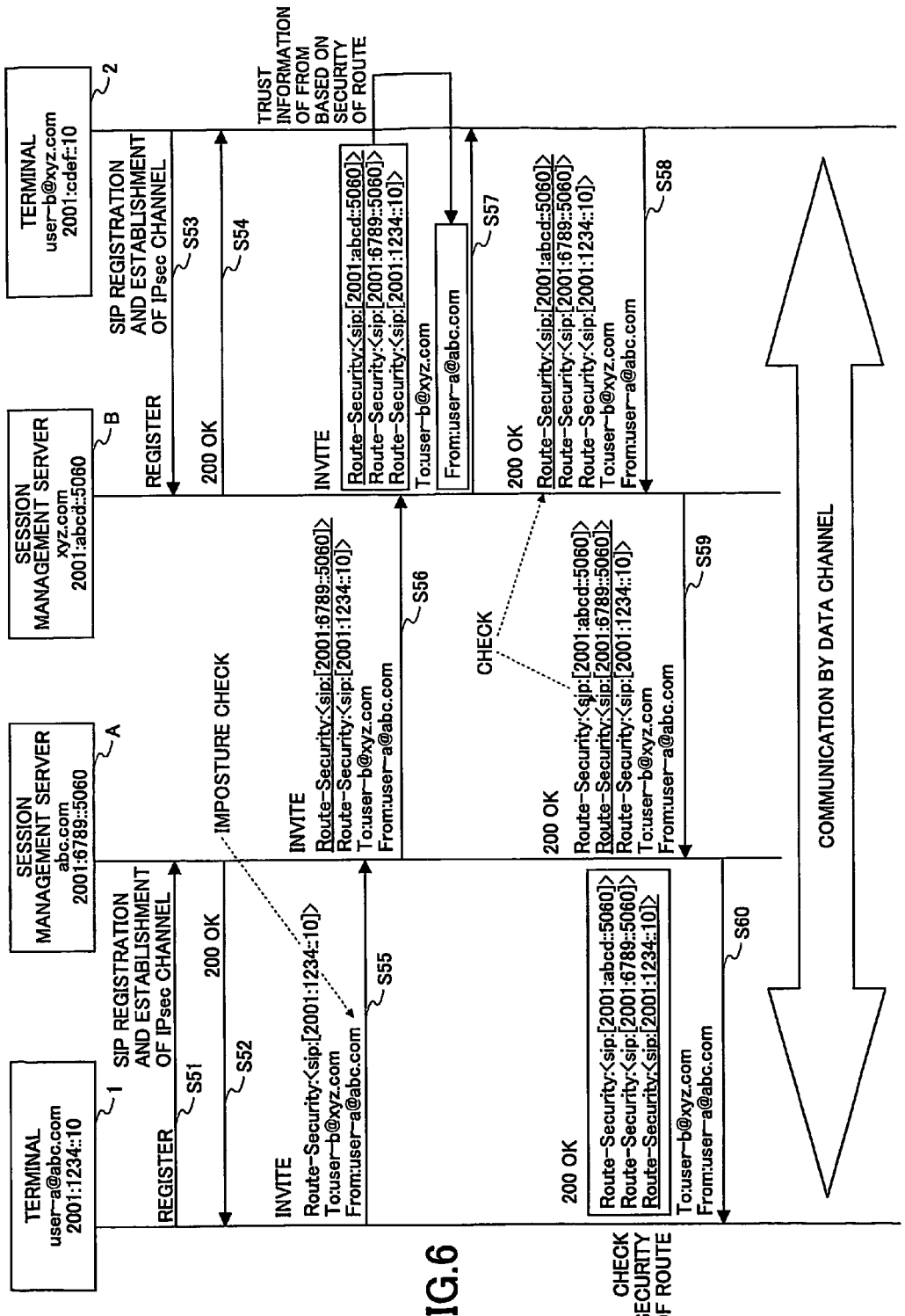
FIG. 6 is a sequence diagram for explaining originator imposture monitoring and Route-security header.

FIG. 6 shows the sequence. FIGS. 7-10 are for explaining the sequence shown in FIG. 6. In the following description, it is assumed that secure signaling channels have been established between the terminal 1 and the session management server A and between the terminal 2 and the session management server B, and names and corresponding addresses have been registered in the session management servers (steps 51-54 in FIG. 6).

Figure 7:
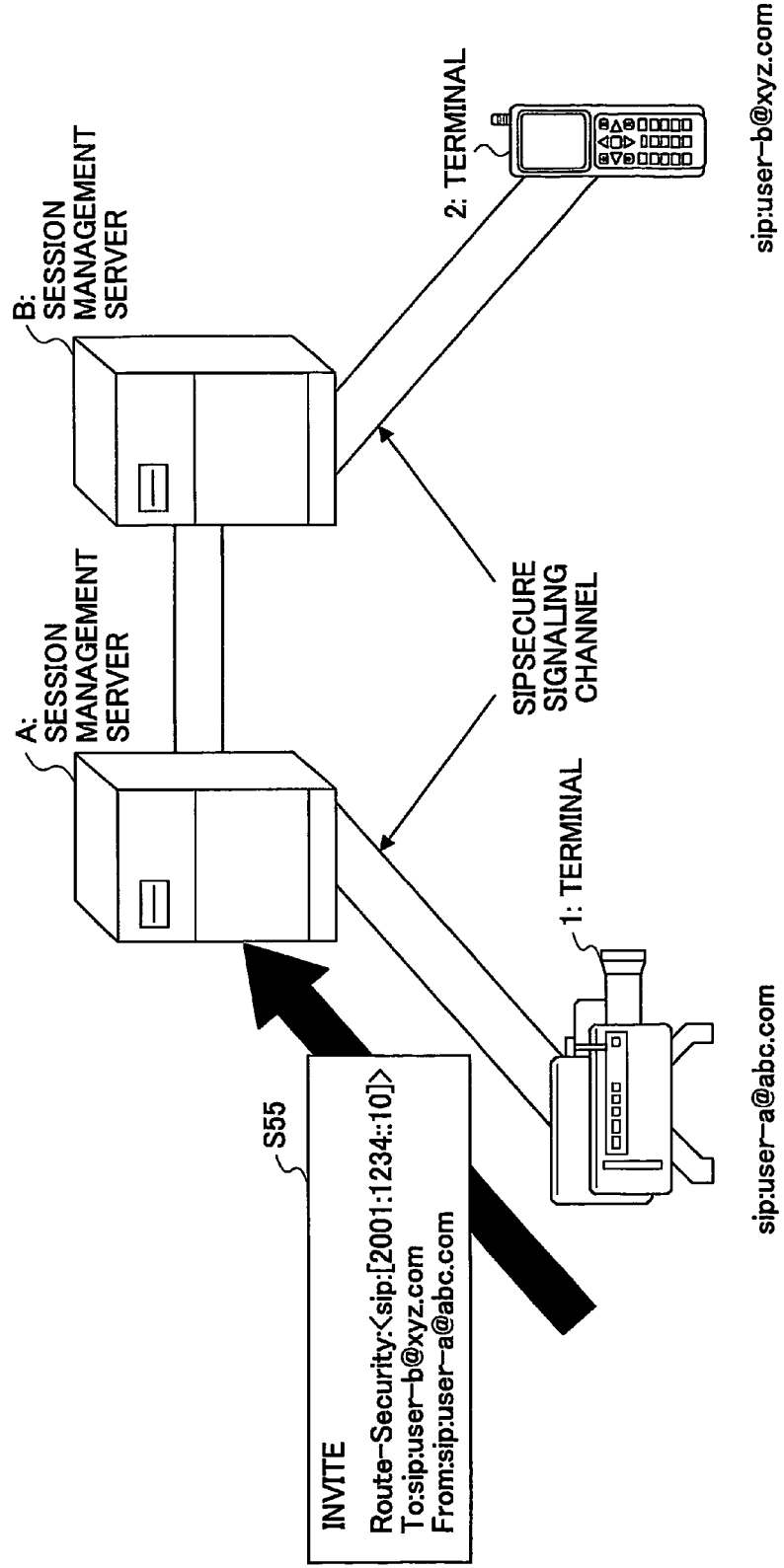
FIG. 7 is a diagram for explaining the sequence shown in FIG. 6.

First, as shown in FIG. 7, an INVITE message is sent to the session management server A in step 55. The INVITE message includes a Route-Security header including an IP address of the terminal 1, a name ("To" line, user-b@xyz.com) of a connection destination (terminal 2) and a name ("From" line, user-a@abc.com) of the sending source (terminal 1).

Figure 8:
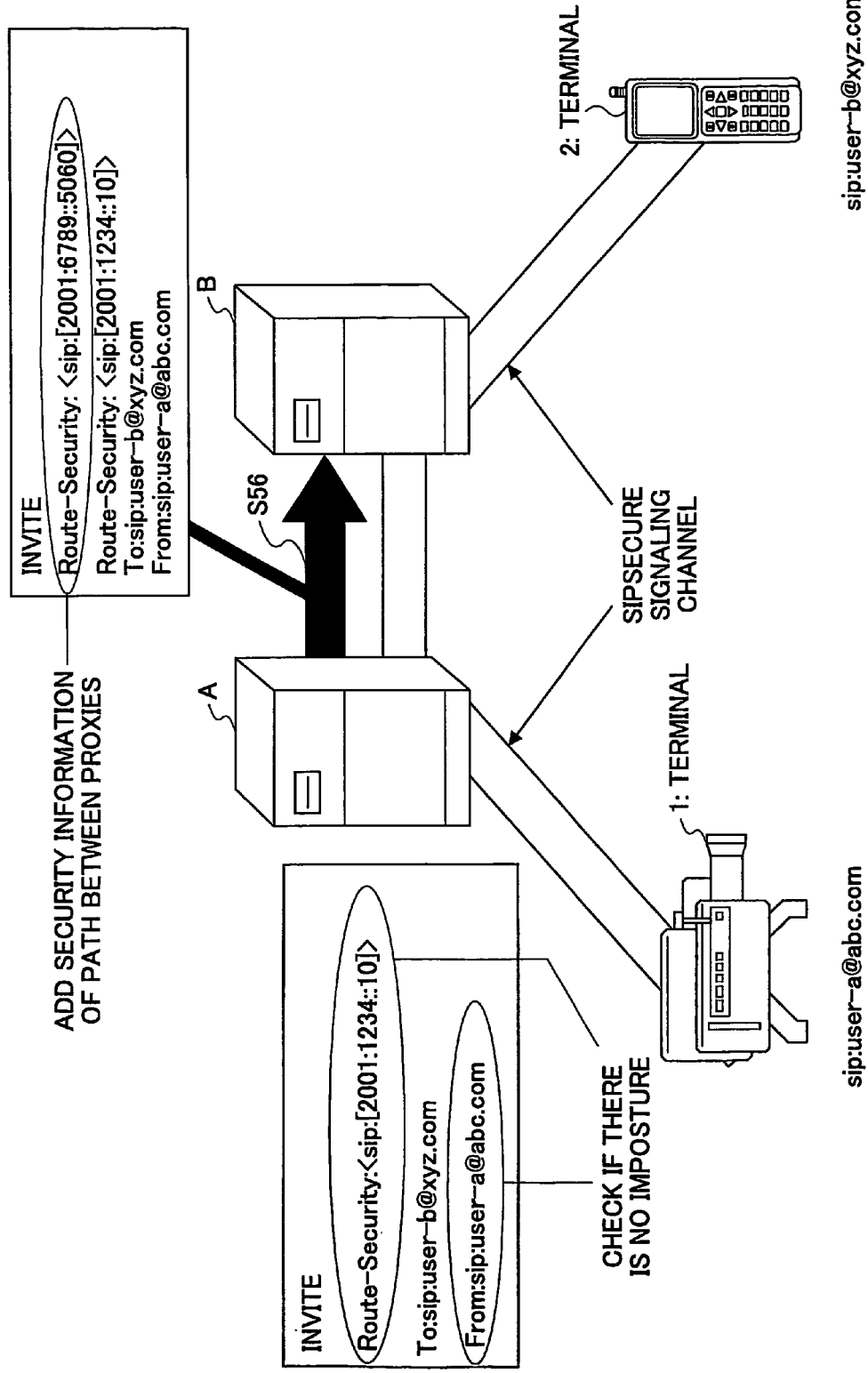
FIG. 8 is a diagram for explaining the sequence shown in FIG. 6.

As shown in FIG. 8, the session management server A that receives the INVITE message checks whether the name of the terminal 1 is correct (whether the name is not an assumed name). The session management server A already stores, in its storage device, the name of the terminal 1, the IP address of the terminal 1, a port number of the terminal 1, and identification information (for example, IPsecSA) for identifying a connection of a secure signaling channel between the terminal 1 and the session management server A. The stored items of information are associated with each other. Therefore, the session management server A can obtain, from the storage device, the name of the source terminal of the INVITE message by using a connection via which the INVITE message is received or by using the IP address of the source terminal. The session management server A compares the obtained name with the name in the "From" line in the received INVITE message. Then, if they are the same, it can be determined that the imposture is not performed (assumed name is not used). In the same way, by comparing an IP address in the Route-Security with an IP address corresponding to the connection, it can be determined whether the Route-Security header is properly added. In this case, if the "From" line or the Route-Security header is not correct, the session management server A may stop transferring the INVITE message and return an error message to the sending source terminal, for example.

Since a secure signaling channel has been established between the terminal 1 and the session management server A that are mutually authenticated, the session management server A can believe that the INVITE message received from the terminal 1 is one sent from the terminal 1. Thus, by checking the name in the "From" line, the session management server A can check whether imposture is performed.

Next, the session management server A adds a Route-Security header including its own IP address to the INVITE message and transfers the INVITE message to the session management server B in step 56. The session management server A and the session management server B are connected via a secure channel like the secure channel between the terminal 1 and the session management server A. The session management server B determines that the INVITE message sent via the channel from the session management server A is one surely sent from the session management server A. Then, the session management server B checks the IP address and the like in the Route-Security header added by the session management server A so as to check if the Route-Security header is properly added.

Figure 9:
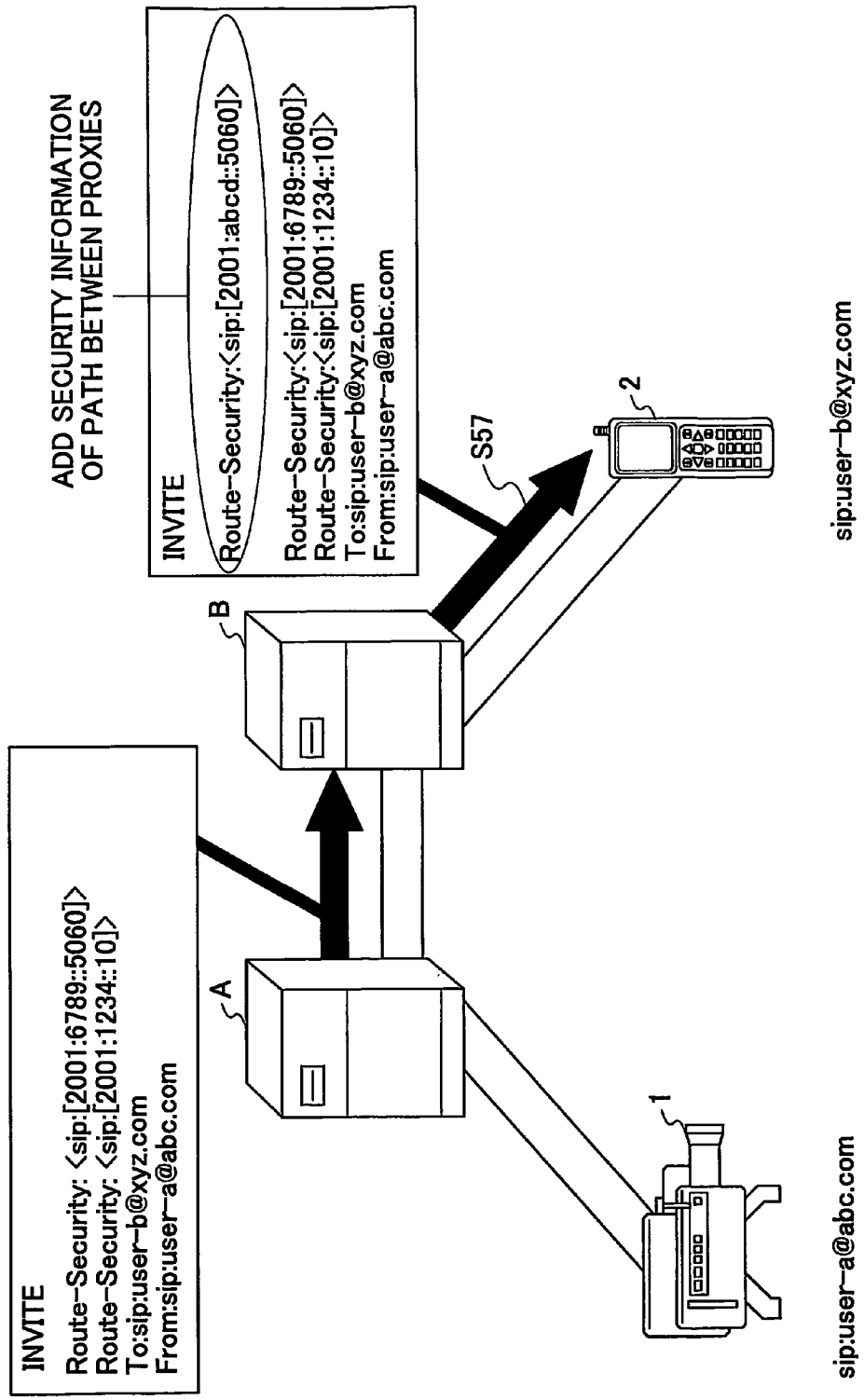
FIG. 9 is a diagram for explaining the sequence shown in FIG. 6.

Next, as shown in FIG. 9, the session management server B adds a Route-Security header including its own IP address to the INVITE message, and sends the INVITE message to the terminal 2 in step 57. The terminal 2 can check reliability of the route via which the INVITE message has been passed by checking Route-Security headers.

Figure 10:
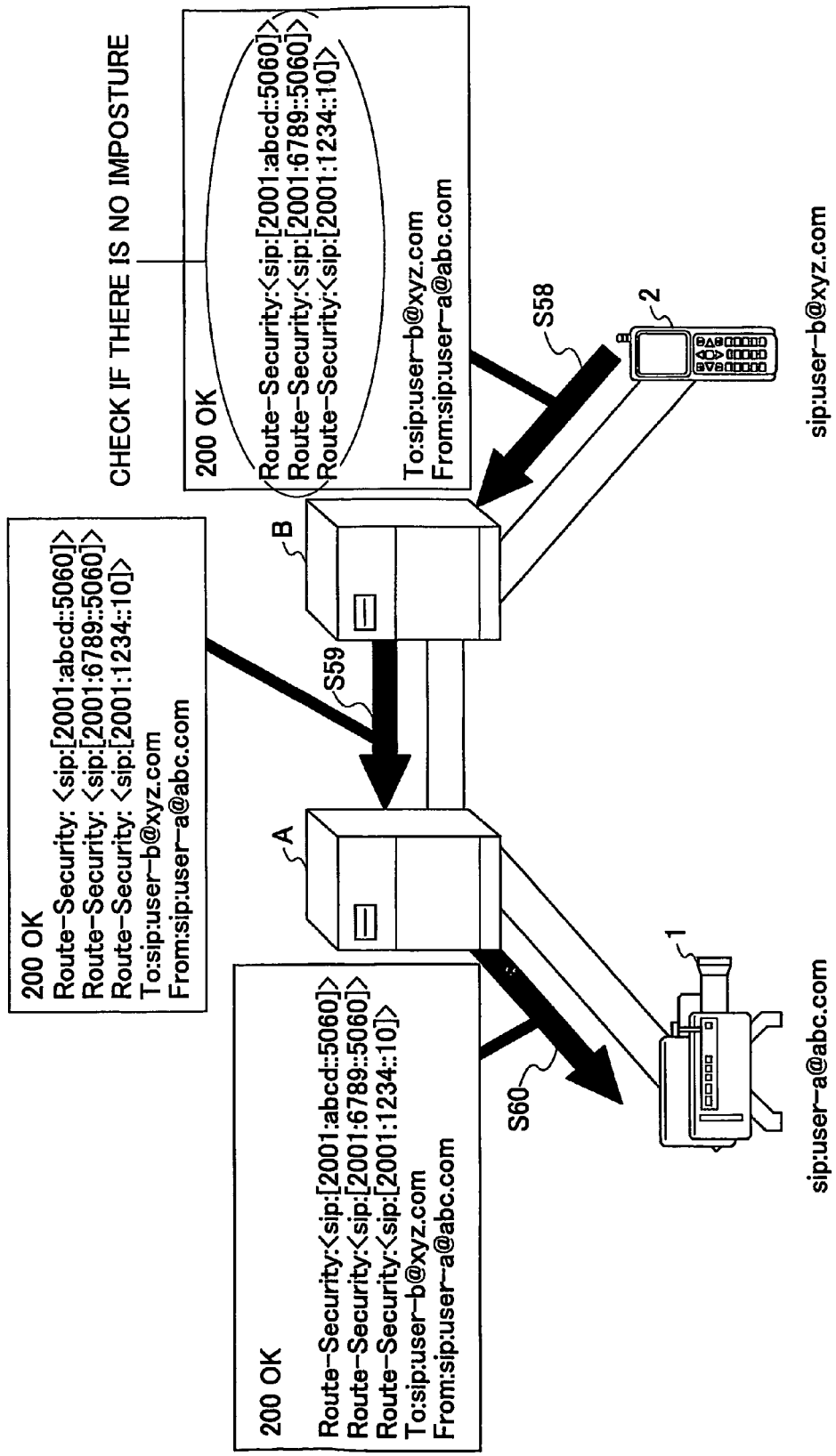
FIG. 10 is a diagram for explaining the sequence shown in FIG. 6.

The terminal 2 that receives the INVITE message sends a response message that includes Route Security headers, "To" line and "From" line, which are the same as those of the received INVITE message, to the terminal 1 via a reverse route against the route via which the INVITE message has been transferred. Therefore, the response message is sent to the session management server B first in step 58 as shown in FIG. 10.

The session management server B that receives the response message from the terminal 2 performs imposture check for the message by determining whether an IP address in a top Route-Security header is the same as its own IP address. Then, the response message is transferred from the session management server B to the session management server A in step 59.

The session management server A performs a check by determining whether an IP address in a second Route-Security header is the same as its own IP address. Then, in step 60, the response message is sent to the terminal 1 that is the source of the INVITE message. The terminal 1 checks validity of the message by determining whether an IP address in a third Route-Security header is the same as its own IP address. In addition, the terminal 1 may check reliability of the whole route by checking the series of the Route-Security headers. For example, when the terminal 1 detects a link of low reliability, the terminal 1 may stop the session.

(Configurations of Each Apparatus)

Figure 11:
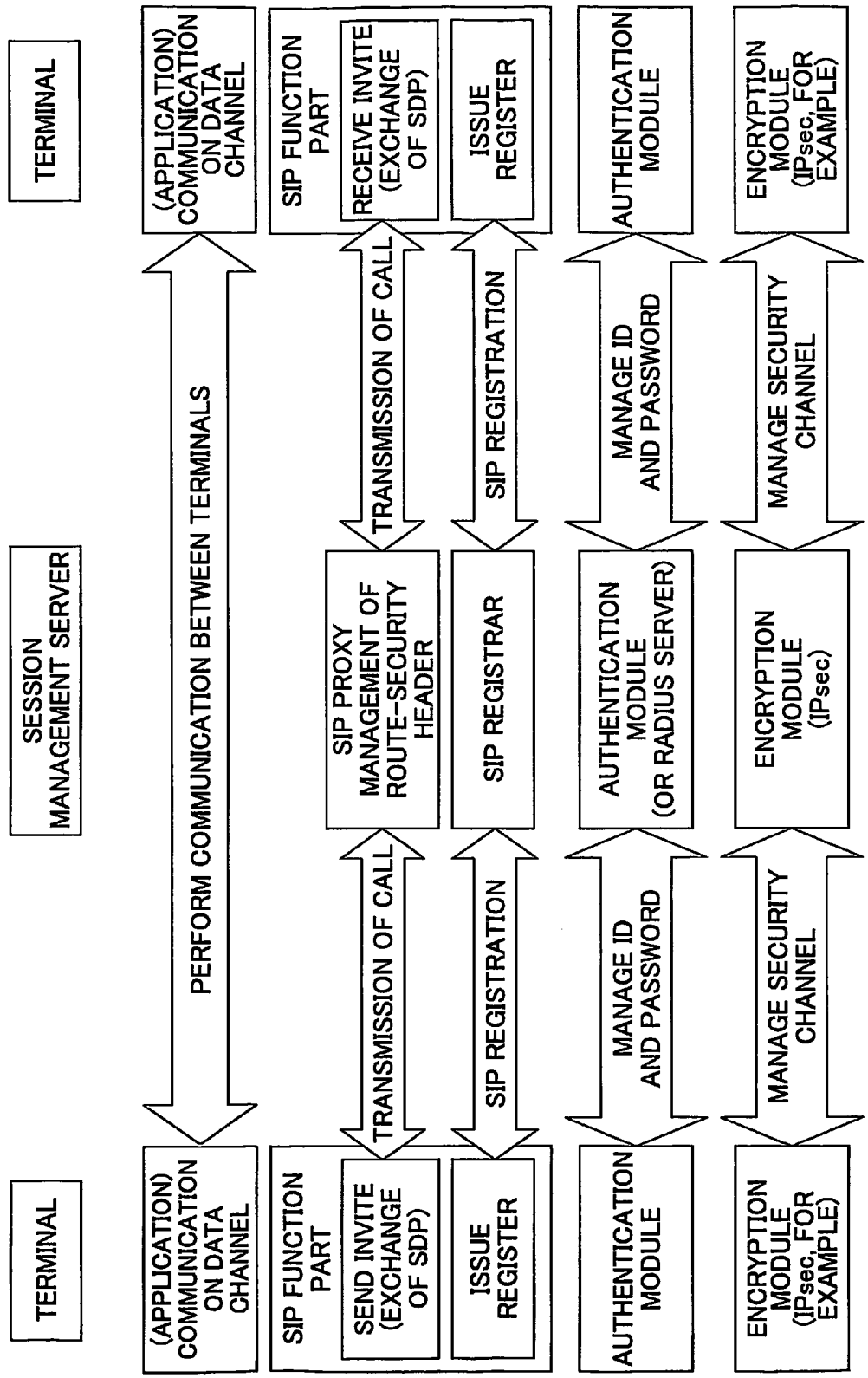
FIG. 11 is a block diagram showing functional configurations of each apparatus in which SIP is used as a signaling protocol.

Next, functional configurations of each apparatus are described with reference to the block diagram of FIG. 11 assuming that SIP is used for the signaling protocol.

The session management server includes a SIP proxy that executes processes for transferring calls (messages), a SIP registrar for registering names of SIP, an authentication module for performing authentication of each terminal by using ID/password or certificates and the like, and an encryption module for performing encrypted communication such as IPsec.

Each terminal includes a function part for performing communication over the secure data channel, a SIP function part, an authentication module and an encryption module. The SIP function part is for performing message communications based on SIP such as receiving/sending of INVITE messages and issuing of REGISTER messages and the like. The authentication module is for authenticating the session management server by using ID/password or a certificate and the like. The encryption module is for performing encrypted communications such as IPsec.

Each function of the session management server and the terminal is realized by a program. Each part of the session management apparatus and the terminal of the present invention is realized by a program and hardware. The terminal may be a general computer such as a PC that includes a CPU, a memory, a hard disk and the like. The terminal also may be a mobile terminal and the like. By installing a program in the computer, the terminal of the present embodiment can be realized. Also, the terminal may be a digital home electrical product. The session management server is a computer such as a server and the like. By installing a program in the server, the session management server of the present embodiment can be realized. Each of the programs can be stored in a computer readable recording medium such as a CD-ROM, a memory and the like.

By adopting the configurations of the present invention, the following effects can be obtained.

Since the terminal performs registration of the name and the IP address each time when the IP address of the terminal is changed, the terminal can adopt so-called dynamic IP address assignment. In addition, since the session management server performs name resolution, it becomes unnecessary to perform name registration in an open DNS that is necessary in conventional technology. In addition, since the signaling procedure is performed after establishing the secure signaling channels between each terminal and the session management server, FW management becomes unnecessary in the terminal side. In addition, since the session management server manages IDs and passwords of each terminal, it becomes unnecessary for each terminal to manage many IDs and passwords. In addition, the connectivity policy control function is adopted in the session management server, so that even name resolution is not performed for a destination terminal to which an originating terminal is not permitted to connect. Thus, even existence of the destination terminal cannot be known to the originating terminal so that unauthorized access can be prevented for the destination terminal. Further, since a port number necessary for establishing a secure data channel is transmitted in the signaling procedure via the secure signaling channel, the port number cannot be known from the outside even when the signaling procedure does not successfully complete. In addition, since only "light" signaling procedure is performed via a middle server (session management server) and real data communications are performed peer-to-peer between the terminals without the middle server, the work load of the middle server does not become heavy.

In addition, although, in the conventional technology, it is necessary to perform security settings such as obtaining certificates or IDs and passwords of all terminals for performing mutually authenticated and encrypted peer-to-peer communications to many terminals, any advance security settings become unnecessary if the terminals are members of the system of the present invention.

Even when encryption of the data channel is unnecessary, a mechanism for ensuring credibility of an originating number is necessary. In the conventional technology, as the mechanism, PKI and the like should be used. However, according to the present invention, imposture and tampering with the original number can be prevented by just performing service setting (ID/password setting of SIP).

In addition, by checking the name in the "From" line in the INVITE message, it can be checked whether the source of the INVITE message uses an assumed name. As a result, reliability can be further improved. In addition, by using the Route-Security header, security of the route can be verified so that reliability can be further improved. Although there is a possibility that a terminal accesses the SIP server via an insecure channel, communications that maintain security can be realized by performing the imposture check and route security check.

In addition, by using the mechanisms of the imposture check and the Route-Security header described in the embodiments, secure communications can be realized between terminals even when an other network is included between the terminals.

Although the route check and the imposture check have been described taking the INVITE message as an example, the route check and the imposture check can be applied to various messages.

(Second Embodiment)

In the following, an embodiment that utilizes the mechanism of the first embodiment is described.

To perform encrypted communications using SSL (Secure Socket Layer) where public-key based certification technology is used, it is necessary to use a public-key certificate issued by a certificate authority (CA). However, it is troublesome to receive the public-key certificate from a CA and to update the public-key certificate periodically. Thus, the public-key based certification technology is not used very much.

In the second embodiment described in the following, the relationship of mutual trust between the terminal and the session management server is utilized so that the terminal can easily register a public-key in the server, and can easily obtain a public-key certificate of the public-key and the public-key itself. Accordingly, the public-key based certification technology can be utilized easily among terminals so that encrypted communications such as SSL (Secure Socket Layer) based communications can be easily used among terminals.

A communication procedure of the present embodiment is next described with reference to FIGS. 12-14.

The system of the second embodiment includes a terminal 11, a terminal 12, a session management server 21, a session management server 22 and a simplified CA server 30. The terminal 11 is in a side for distributing a public-key. The terminal 12 receives the public-key and performs public-key based encrypted communications with the terminal 11. Each of the session management servers 21 and 22 includes the same functions as the ones in the first embodiment. It is assumed that secure signaling channels have been established by performing steps described in the first embodiment between each pair of nodes. Although the session management server and the simplified CA server are separated in this embodiment, they may be realized as one apparatus. That is, the session management server in the first embodiment may include functions of the simplified CA server in this embodiment. In addition, the simplified CA server and the session management server that are connected via a secure channel may be called a public-key management apparatus.

In addition, in this embodiment, each of the terminals, the session management servers 21, 22 and the simplified CA management server 30 has a function for receiving/sending a PUBLISH message (SIP message) used for requesting the simplified CA management server to issue a public-key certificate. The PUBLISH message is used by including a public-key or a public-key certificate in its body part.

Figure 12:
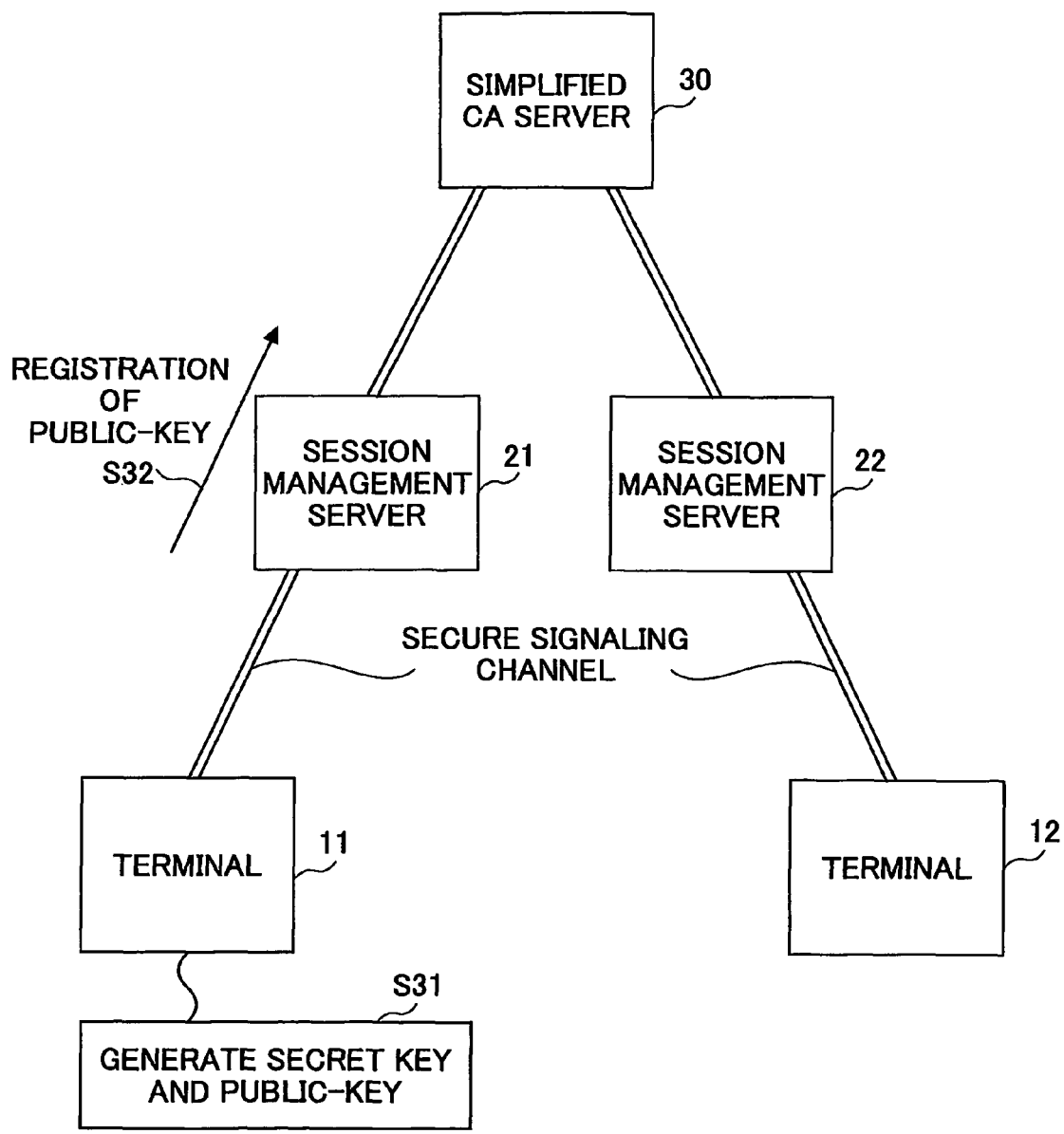
FIG. 12 is a diagram for explaining a communication procedure in a second embodiment.

In FIG. 12, first, the terminal 11 generates a pair of a secret-key and a public-key in step 31. Then, the terminal 11 sends the public-key to the simplified CA server 30 via a secure signaling channel between the terminal 11 and the session management server 21 and via a secure signaling channel between the session management server 21 and the simplified CA server 30 in step 32. The simplified CA server 30 registers the public-key, and generates a public-key certificate by using a secret-key of the simplified CA server 30.

Figure 13:
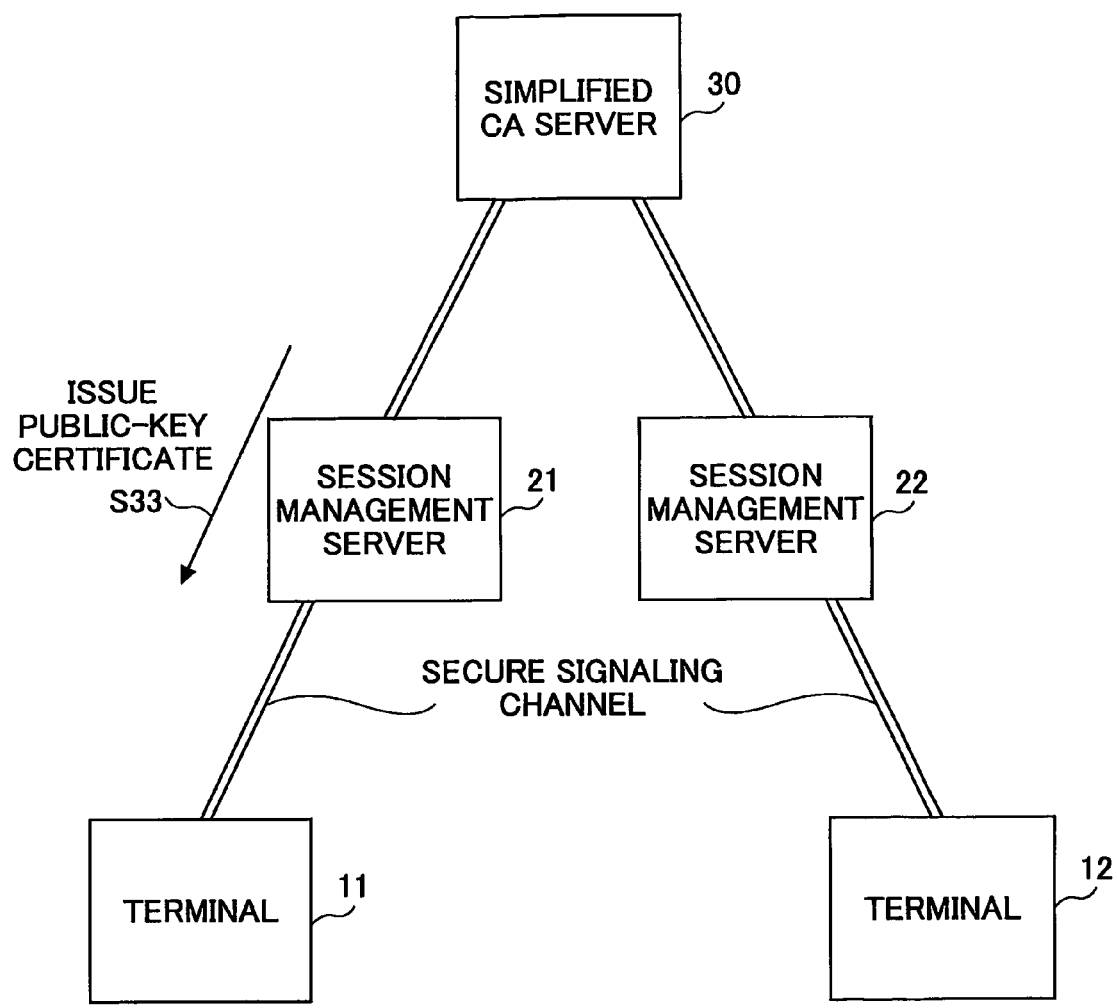
FIG. 13 is a diagram for explaining a communication procedure in the second embodiment.
Figure 14:
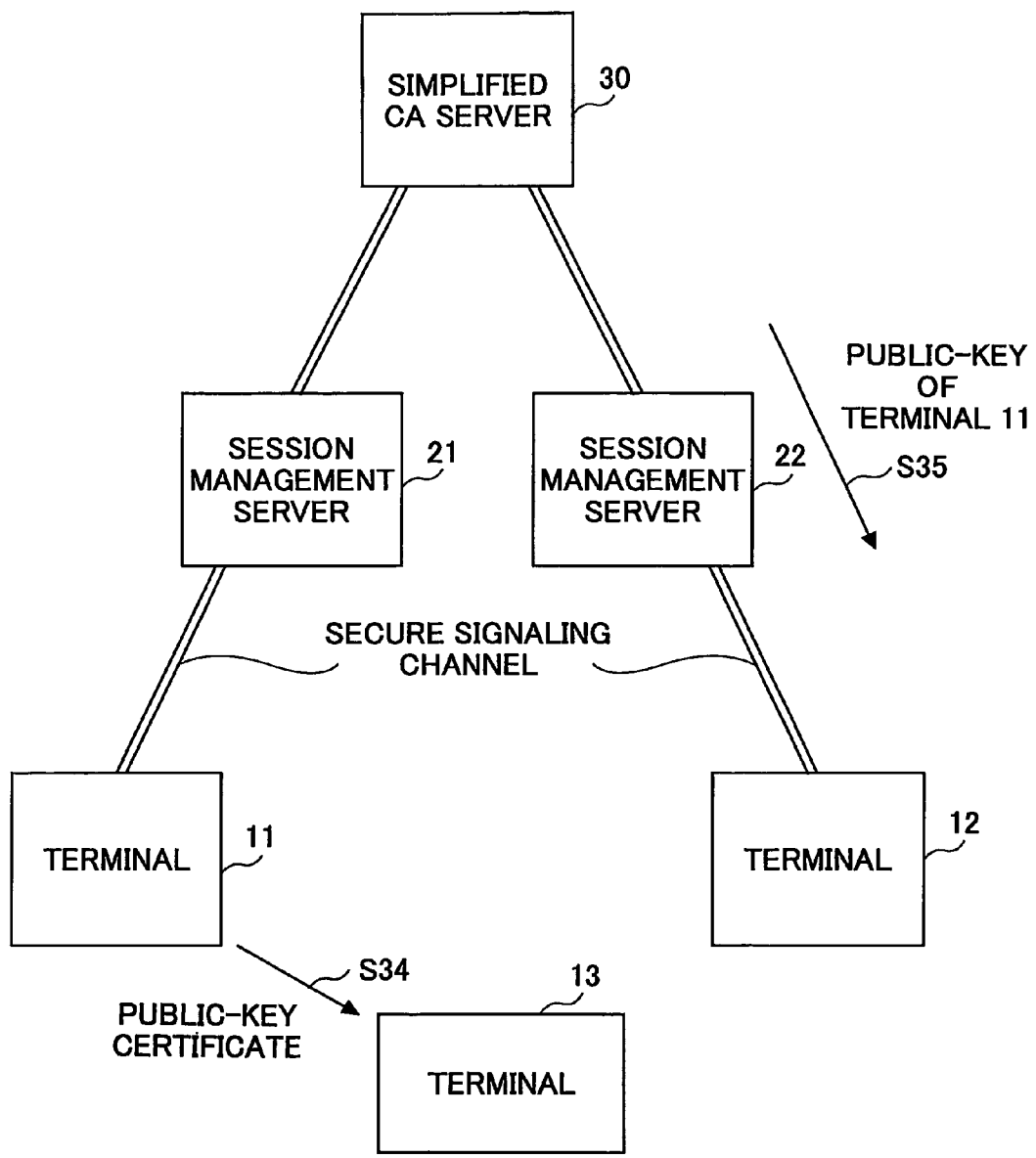
FIG. 14 is a diagram for explaining a communication procedure in the second embodiment.

Next, in FIG. 13, the terminal 11 obtains the public-key certificate from the simplified CA server 30 via the session management server 21 in step 33. The public-key certificate may be issued only within a given period of time by the simplified CA server 30. The given period of time corresponds to the term of validity of the public-key certificate. Then, as shown in FIG. 14, the terminal 11 distributes the public-key certificate to a general terminal 13 in step 34. Accordingly, for example, SSL (Secure Socket Layer) communications can be performed between the terminal 11 and the terminal 13. The method for performing the SSL (Secure Socket Layer) communications by using the public-key is the same as a conventional method of SSL (Secure Socket Layer) communications.

In addition, the terminal 12 can receive the public-key of the terminal 11 without the public-key certificate in step 35 since the terminal 12 is securely connected to the simplified CA server 30 and a relationship of trust is established between the server 30 and the terminal 12. As a result, encrypted communications based on public-key can be realized between the terminals 11 and 12.

Figure 15:
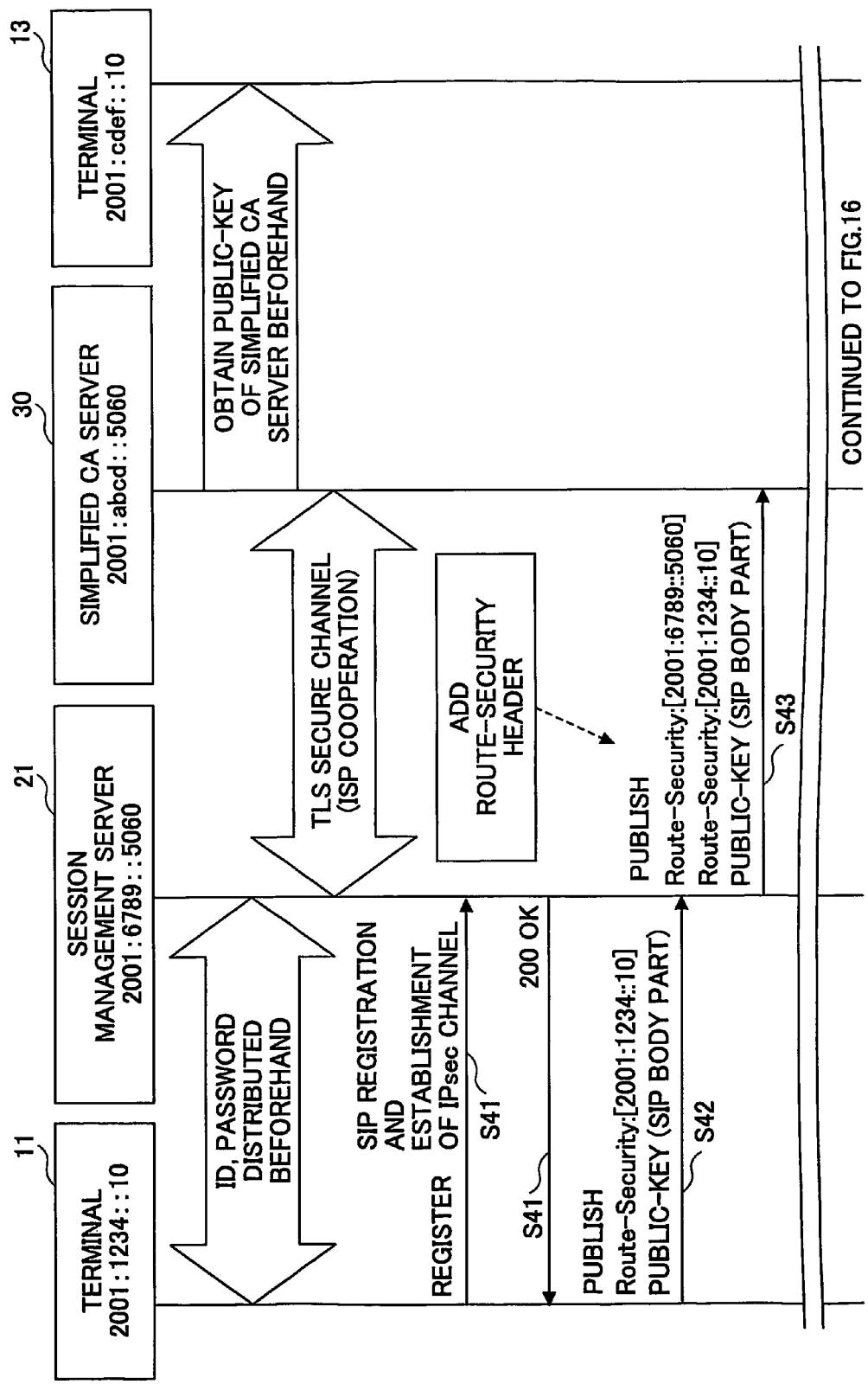
FIG. 15 shows a sequence for establishing a secure data channel (SSL (Secure Socket Layer) communication channel) between a terminal 11 and a terminal 13.
Figure 16:
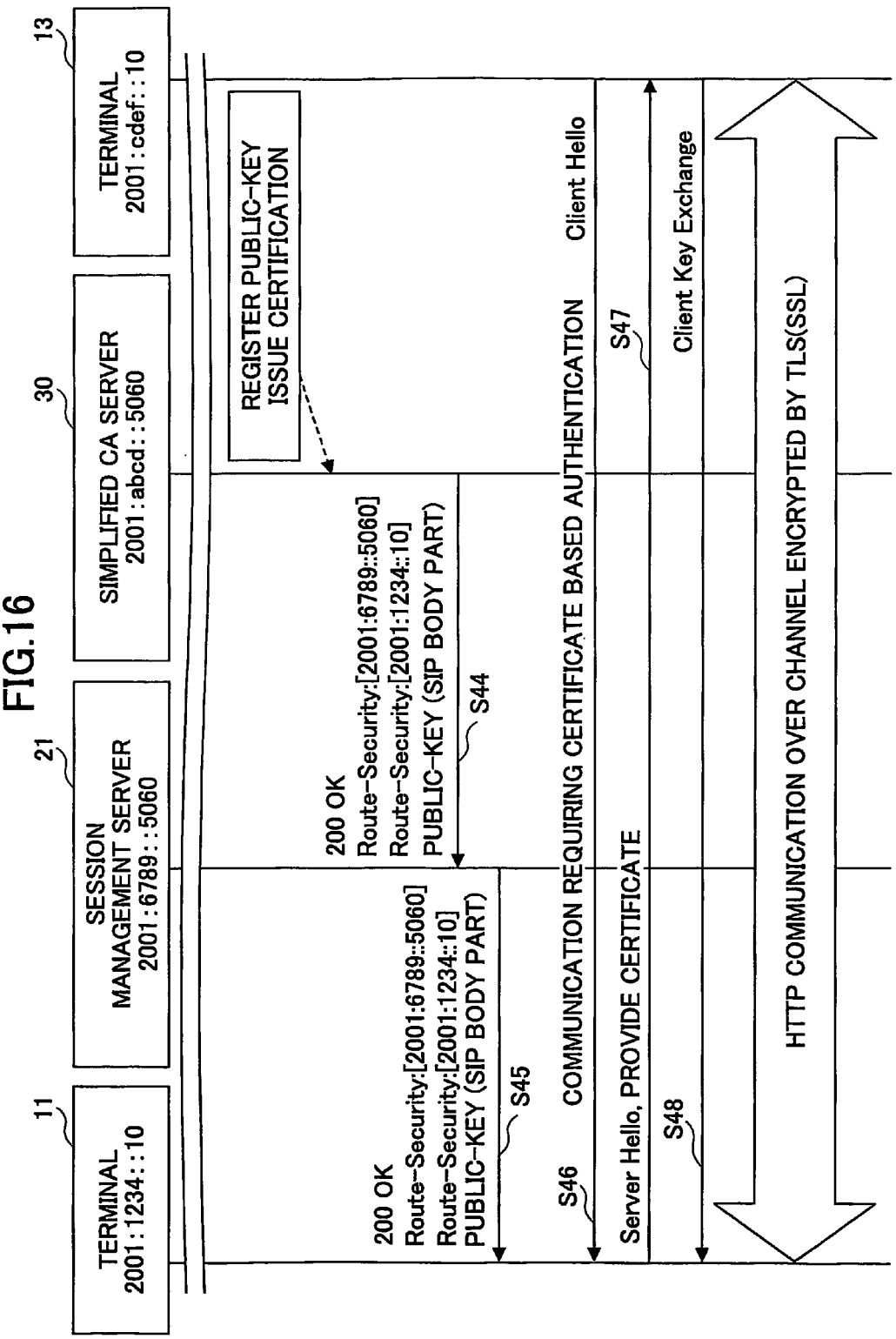
FIG. 16 shows a sequence for establishing a secure data channel (SSL (Secure Socket Layer) communication channel) between a terminal 11 and a terminal 13.

FIGS. 15 and 16 show a sequence for establishing a secure data channel (SSL (Secure Socket Layer) communication channel) between the terminal 11 and the terminal 13. In FIGS. 15 and 16, the session management server 22 is not shown.

Between the terminal 11 and the session management server 21, a secure signaling channel is established by using the REGISTER message and SIP name registration is performed in step 41 in the same way as the first embodiment. The session management server 21 and the simplified CA server 30 are connected by a TLS (Transport Layer Security) secure channel. It is assumed that the terminal 13 has obtained a public-key of the simplified CA server 30.

For registering the public-key of the terminal 11, the terminal 11 sends a PUBLISH message that includes the public-key in the body of the PUBLISH message to the session management server 21 in step 42. The session management server 21 transfers the PUBLISH message to the simplified CA server 30 in step 43. The simplified CA server 30 registers the public-key and issues a public-key certificate for the public-key, and sends a response message that includes the public-key certificate in the body to the session management server 21 in step 44 in response to the PUBLISH message. Then, the session management server 21 transfers the response message to the terminal 11 in step 45. After that, sessions are initiated for performing SSL (Secure Socket Layer)_encrypted communications between the terminal 11 and the terminal 13 in step 46. After step 46, a procedure the same as general SSL (Secure Socket Layer) communications is performed. That is, by performing the procedure from step 40 to step 45 beforehand, SSL (Secure Socket Layer) communications can be freely conducted at any timing between the terminals 11 and 13.

Figure 17:
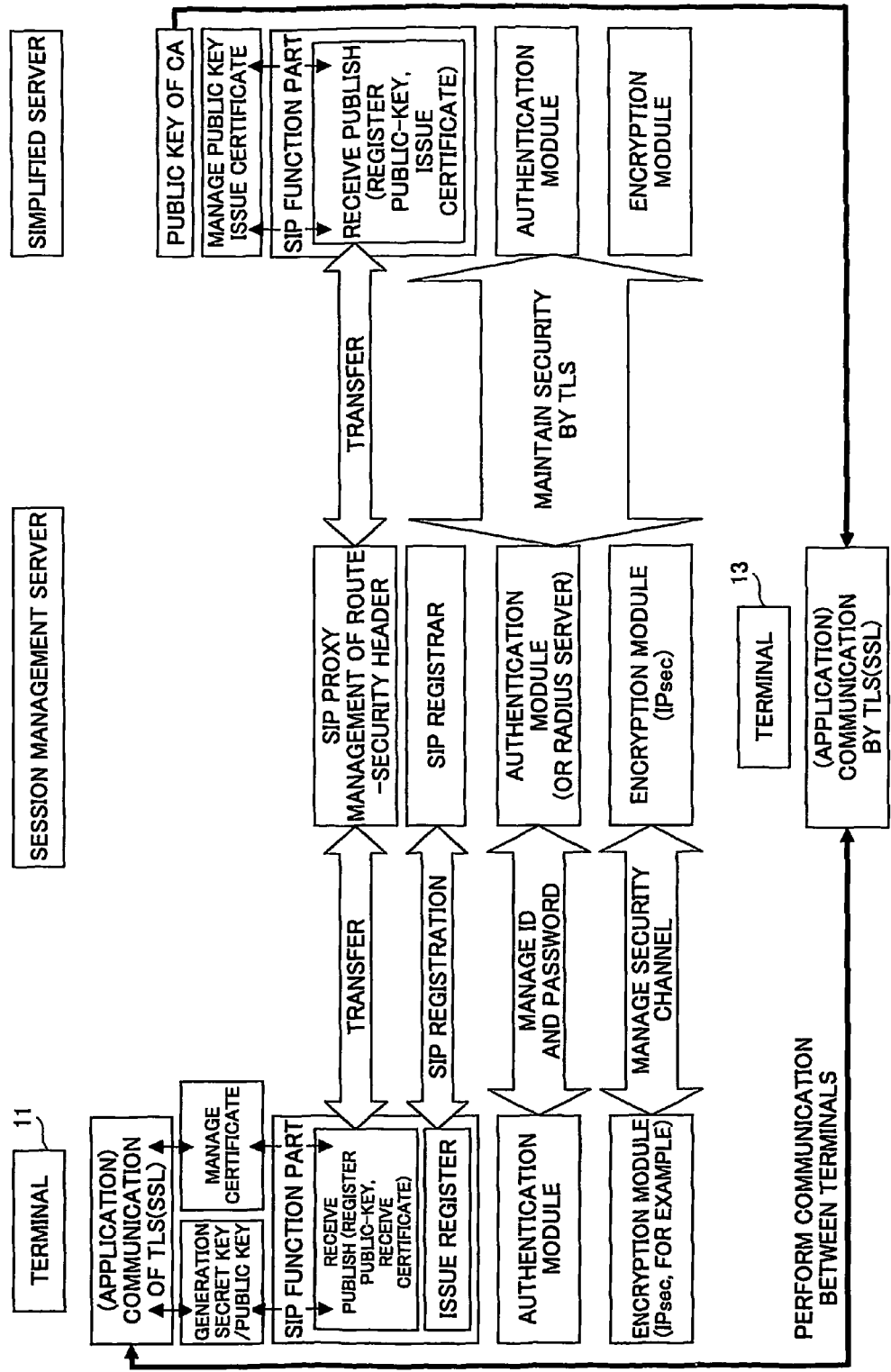
FIG. 17 is a functional block diagram of each apparatus in the second embodiment.

FIG. 17 shows a functional block diagram of each apparatus in this embodiment.

Functions of the session management server are the same as those of the first embodiment. As for the terminal, in addition to the functions of FIG. 6, the SIP function part includes a PUBLISH message send function. In addition, the terminal includes a generation function of a secret key and a public-key and a management function of a public-key certificate. In addition, the simplified CA server includes a function for performing management of public-keys and a function for issuing public-key certificates in addition to the encryption module, authentication module and the SIP function part. In the management of public-keys, for example, the simplified CA server stores each public-key with identification information of a terminal corresponding to the public-key in a storage device.

As mentioned above, according to the present embodiment, a simplified public-key management model can be realized based on the relationship of mutual trust among the terminal, the session management server and the simplified CA server.

Although a case where SIP is used as means for sending/receiving information is described in each of the above-mentioned embodiments, the means for sending/receiving information is not limited to SIP. For example, HTTP can be used instead of SIP.

(Third Embodiment)

In the following, a further embodiment is described in which the mechanism for establishing a secure data channel by performing the signaling procedure described in the first embodiment is applied. In the following description, "http" is broadly used to include a meaning of "https" unless otherwise specified.

In this embodiment, one of the terminals (terminal 1, in this case) in the system of FIG. 2 includes a gateway function. In the following, the terminal 1 is called a gateway apparatus 1. A mobile terminal such as a mobile phone or a PDA accesses the gateway apparatus 1 so that the mobile terminal and the terminal 2 can perform communications by using a secure data channel in this embodiment.

Figure 18:
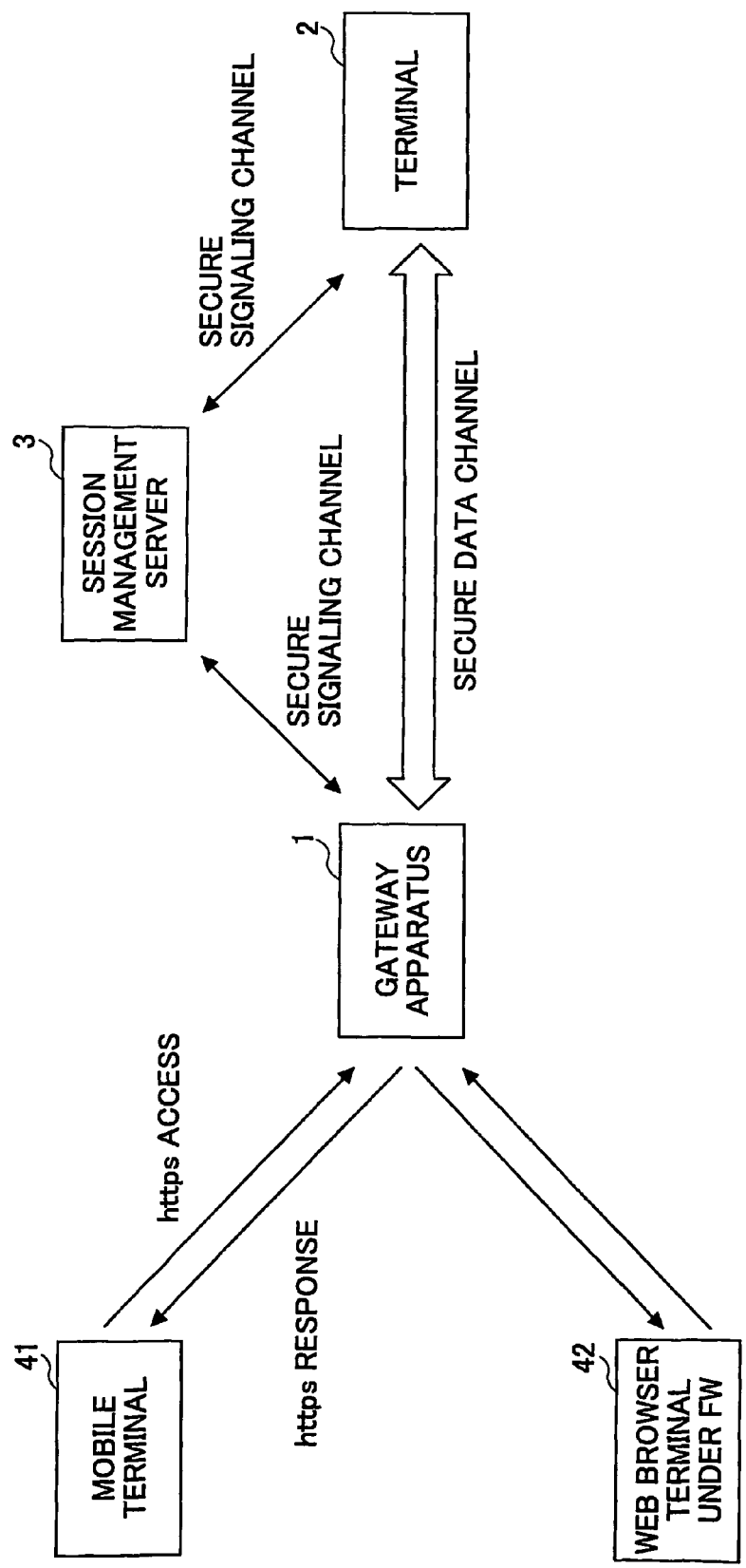
FIG. 18 shows a system configuration of a third embodiment.

FIG. 18 shows the entire configuration of this embodiment. As shown in FIG. 18, the terminal 1 shown in FIG. 2 is replaced by the gateway apparatus 1. In the system of FIG. 18, the mobile terminal 41 or a Web browser terminal 42 accesses the gateway apparatus 1 so that a secure data channel is established between the gateway apparatus 1 and the terminal 2. Then, the mobile terminal 41 or a Web browser terminal 42 communicates with the terminal 2 via the gateway apparatus. For example, the terminal 2 is a Web server that permits only access from a specific user that is the mobile terminal 41 or the Web browser terminal 42.

Figure 19:
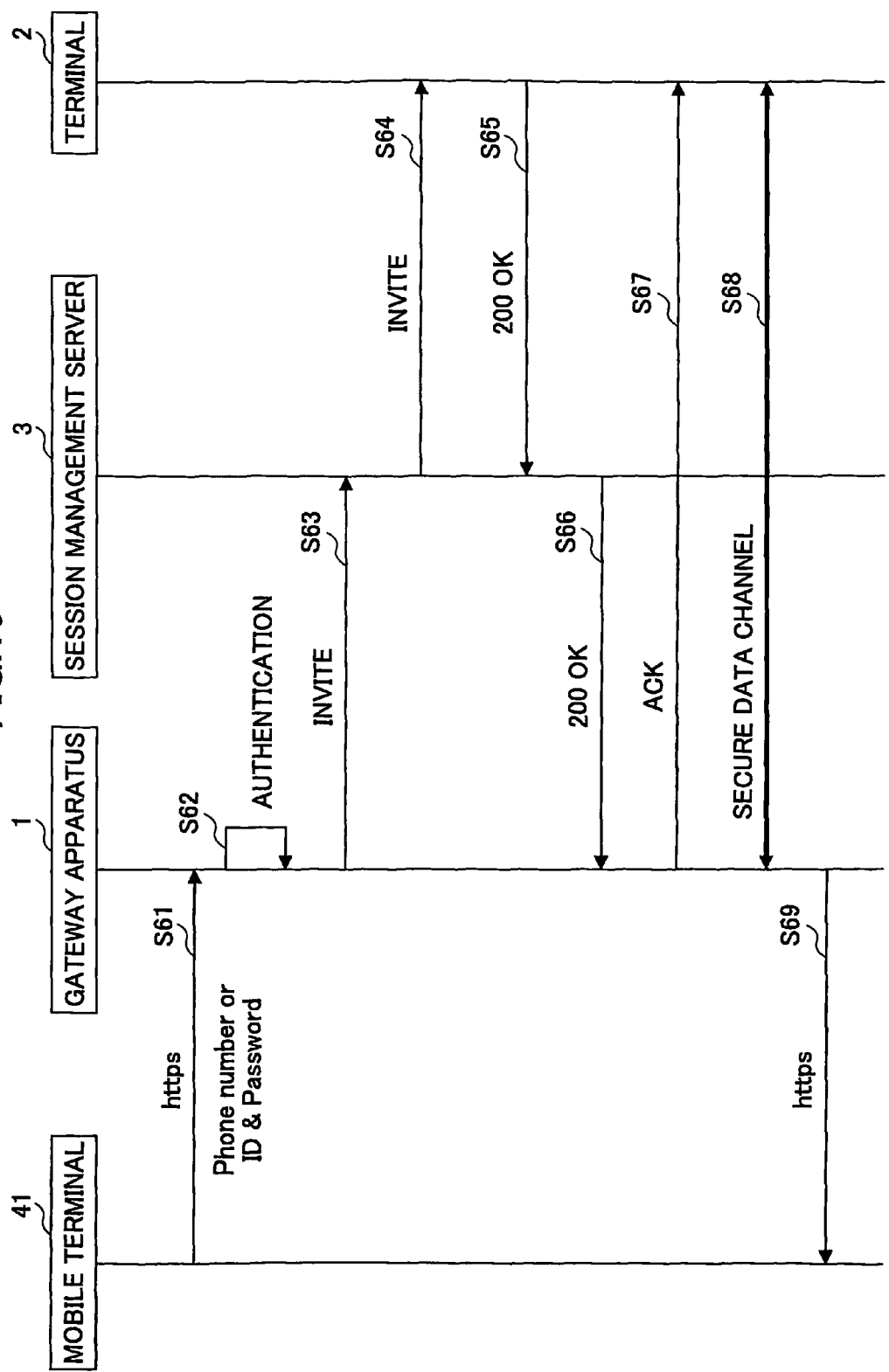
FIG. 19 is a sequence diagram of a third embodiment.

Next, by referring to the sequence chart of FIG. 19, the operation of the present embodiment is described. In the sequence of FIG. 19, it is assumed that secure signaling channels between the gateway apparatus 1 and the session management server 3 and between the session management server 3 and the terminal 2 have been established. In the following, the mobile terminal 41 is taken as an example of a terminal that accesses the gateway apparatus 1.

First, the mobile terminal 41 accesses the gateway apparatus 1 by using http protocol in step 61. At this time, the gateway apparatus 1 obtains a telephone number of the mobile terminal 41. Alternatively, the mobile terminal 41 may send its ID and password to the gateway apparatus 1 that obtains the ID and password. The gateway apparatus 1 authenticates the mobile terminal 41 by using the telephone number or the ID and password in step 62.

The gateway apparatus 1 has a table including each user identifier (telephone number or ID) and names of connection destinations to which the user of the user identifier is permitted to connect as shown in FIG. 20. For example, when the mobile terminal 41 accesses the gateway apparatus 1, the gateway apparatus 1 obtains the names from the table and sends the names to the mobile terminal 41. The mobile terminal 41 displays the names so that the user of the mobile terminal 41 selects a specific name. Then, the mobile terminal 41 sends the specific name to the gateway apparatus 1. Accordingly, the gateway apparatus 1 can obtain a name of access destination for the mobile terminal 41. When displaying the names, the mobile terminal 41 may display images indicating outlines of each destination site corresponding to the names. Alternatively, the user may directly input a name of the destination so that the mobile terminal 41 sends the name to the gateway apparatus 1. Further, the gateway apparatus 1 that has obtained the name of the destination in the above-mentioned way sends an INVITE message including the name to the session management server 3 to perform connection request to the connection destination (terminal 2 in this embodiment) indicated by the name. The processes of the steps 63-66 shown in FIG. 19 are the same as processes of the steps 7-12 of FIG. 2.

After the secure data channel is established, the mobile terminal 41 receives a http response in step 69. After that, communications are performed between the mobile terminal 41 and the gateway apparatus 1 and between the gateway apparatus 1 and the terminal 2 by using http protocol or https protocol. In the communications, the gateway apparatus 1 receives data from the terminal 2, and the gateway apparatus 1 sends the data to the mobile terminal 41. In addition, the gateway apparatus 1 performs data conversion as necessary such that the mobile terminal 41 can properly display the data. In addition, the gateway apparatus 1 receives a request from the mobile terminal 41 and sends the request to the terminal 2.

In the above-mentioned example, a secure signaling channel has been established between the gateway apparatus 1 and the session management server 3 beforehand. Alternatively, the secure signaling channel between the gateway apparatus 1 and the session management server 3 may be established in response to an access by the mobile terminal 41.

Figure 21:
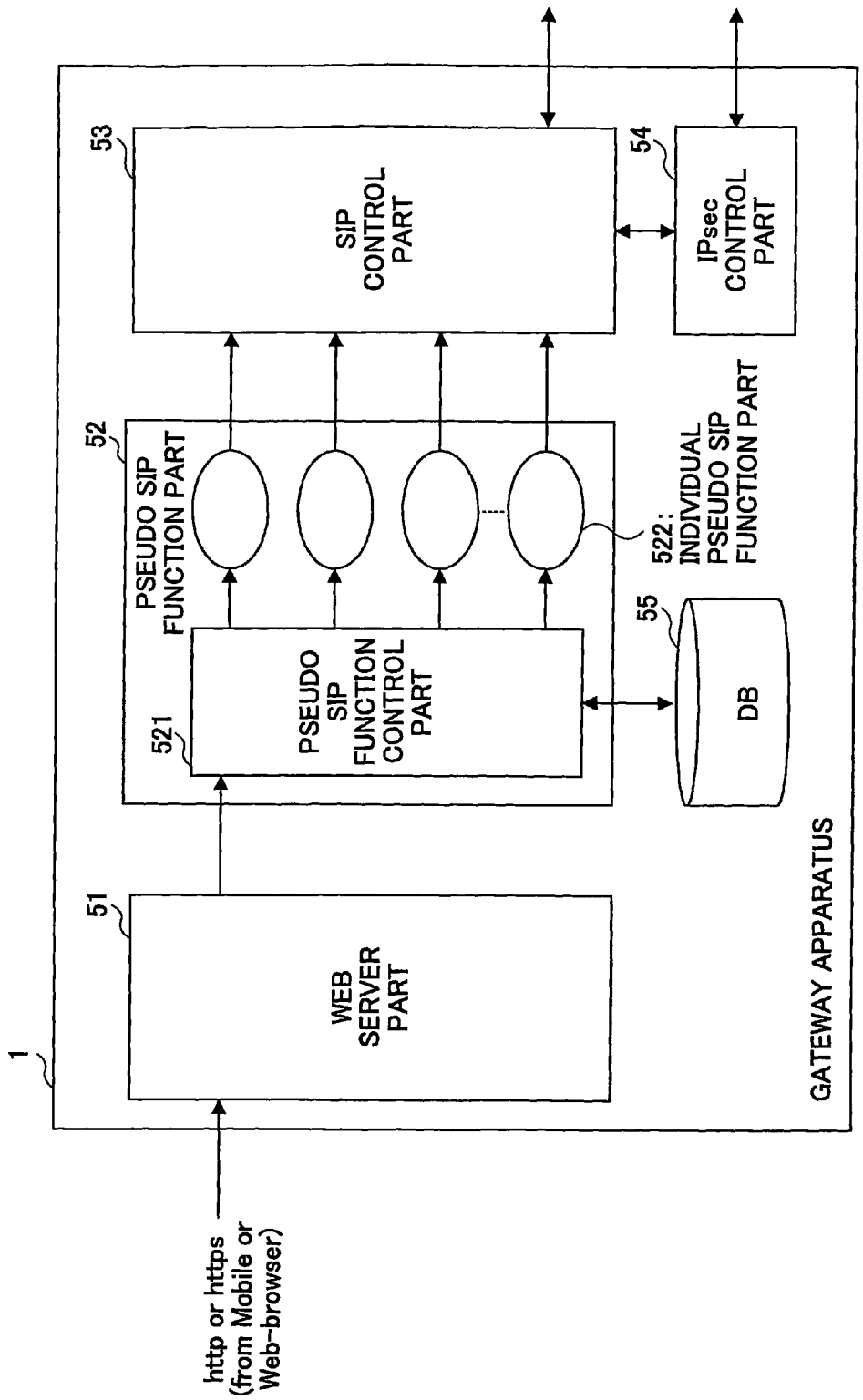
FIG. 21 is a block diagram of a gateway apparatus 1.

FIG. 21 shows a functional block diagram of the gateway apparatus 1. FIG. 21 mainly shows functions for performing the signaling procedure for establishing a data channel.

As shown in FIG. 21, the gateway apparatus 1 includes a Web server part 51 for performing http protocol processes, a pseudo SIP function part 52, a SIP control part 53, an IPsec control part 54, and a database 55 used for authentication of the mobile terminal and the like. In addition, although not shown in the figure, the gateway apparatus 1 includes a http protocol process part for performing http communications between the gateway apparatus 1 and the terminal 2 performed after the secure data channel is established.

The pseudo SIP function part 52 includes a pseudo SIP function control part 521 which generates an individual pseudo SIP function part 522 in response to an access from the mobile terminal 41. Each individual pseudo SIP function part 522 performs a signaling procedure for establishing a secure signaling data channel on behalf of a mobile terminal accessing the gateway apparatus 1. Since the pseudo SIP function part 52 functions as the SIP function part in the terminal shown in FIG. 2 on behalf of the mobile terminal 41, the part 52 is called "pseudo" SIP function part. The individual pseudo SIP function part 522 generates substantive information to be included in a SIP message, and passes the substantive information to the SIP control part 53. Then, the SIP control part 53 generates a packet in conformity with the SIP protocol and sends the packet. The IPsec control part 54 corresponds to the encryption module shown in FIG. 6.

Next, operations of the whole system are described. In the following operations, it is assumed that the secure signaling channel between the gateway apparatus 1 and the session management server 3 has been established. The mobile terminal 41 and the gateway apparatus 1 may use either of http or https.

First, the Web server part 51 receives a http request sent from the mobile terminal 41. The Web server 51 passes information in the http request to the pseudo SIP function control part 521. The pseudo SIP function control part 521 authenticates the mobile terminal 41 by using ID and the like included in the information by referring to the database 55. If the mobile terminal 41 is successfully authenticated, the gateway apparatus 1 generates an individual pseudo SIP function control part 522 corresponding to the accessing mobile terminal

41. Then, for example, the gateway apparatus 1 obtains a name of a connection destination of the mobile terminal 41 by performing an above-mentioned procedure for obtaining a connection destination name. The table information shown in FIG. 20 is included in the database 55.

After that, the individual pseudo SIP function part 522 generates an INVITE message that is a connection request, and sends the INVITE message to the session management server 3 via the SIP control part 53. Then, by performing the steps shown in FIG. 19, the IPsec control part 54 generates an IPsec connection (secure data channel) to the terminal 2. After that, communications can be preformed between the gateway apparatus 1 and the terminal 2 via the secure data channel by using http or https. Then, data received by the gateway apparatus 1 are converted as necessary and the data are sent to the mobile terminal 41.

As mentioned above, according to this embodiment, the gateway apparatus 1 includes the pseudo SIP function and performs the signaling procedure for establishing the secure data channel on behalf of the mobile terminal 41.

Therefore, even a terminal that has only a http communication function can perform secure communications with a connection destination terminal via a secure data channel by just connecting to the gateway apparatus 1 by http. In the connection procedure, the terminal does not need to know that the connection destination terminal is a terminal that establishes a channel by using SIP. Therefore, the mechanism described in the first embodiment can be widely applied.

In addition, since the gateway apparatus 1 includes a table shown in FIG. 20 that stores connectable destinations for each terminal, even a terminal that does not have enough operations functions such as a mobile phone can connect to a destination easily by just selecting a destination after accessing a portal site provided by the gateway apparatus 1.

The present invention is not limited to the specifically disclosed embodiments, and variations and modifications may be made without departing from the scope of the invention.

The present application contains subject matter related to Japanese Patent Application No. 2003-374880, filed in the JPO on Nov. 4, 2003, Japanese Patent Application No. 2004-034172, filed in the JPO on Feb. 10, 2004, and Japanese Patent Application No. 2004-037314, filed in the JPO on Feb. 13, 2004, the entire contents of which are incorporated herein by reference.

The invention claimed is:

1. A session management apparatus that can connect to a first apparatus and a second apparatus over a network, the first apparatus and the second apparatus exchanging Session Initiation Protocol (SIP) messages via the session management apparatus to establish a connection, the session management apparatus comprising:
    circuitry configured to:
        exchange key information for encrypted communication with the first apparatus;
        perform mutual authentication with the first apparatus to establish a first encrypted communication channel between the session management apparatus and the first apparatus; and to
        store a name of the first apparatus and identification information of the first encrypted communication channel in a storage device, wherein the name of the first apparatus is obtained from a REGISTER message sent by the first apparatus, and the name of the first apparatus and the identification information are associated with each other;
        establish a second encrypted communication channel between the session management apparatus and the second apparatus based on mutual authentication with the second apparatus;
        receive an INVITE message including a name of the first apparatus via the first encrypted communication channel;
        determine whether the name included in the INVITE message is correct by comparing the name included in the INVITE message with the name, obtained from the REGISTER message, that is stored in the storage device and that is associated with the identification information of the first encrypted communication channel; and
        send the INVITE message to the second apparatus via the second encrypted communication channel.

2. The session management apparatus as claimed in claim 1, wherein, if the session management apparatus determines that the name of the first apparatus included in the INVITE message is not correct, the session management apparatus sends an error message to the first apparatus.

3. A session management apparatus that can connect to a first apparatus and a second apparatus over a network, the first apparatus and the second apparatus exchanging Session Initiation Protocol (SIP) messages via the session management apparatus to establish a connection, the session management apparatus comprising:
    circuitry configured to:
        exchange key information for encrypted communication with the first apparatus;
        perform mutual authentication with the first apparatus to establish a first encrypted communication channel between the session management apparatus and the first apparatus;
        establish a second encrypted communication channel between the session management apparatus and the second apparatus based on mutual authentication with the second apparatus;
        receive, from the first apparatus via the first encrypted communication channel, an INVITE message including a first header indicating reliability of a route between the first apparatus and the session management apparatus;
        add a second header indicating reliability of a route between the session management apparatus and the second apparatus to the INVITE message; and
        send the INVITE message to the second apparatus via the second encrypted communication channel, wherein,
        when the session management apparatus receives, from another session management apparatus, an INVITE message to which headers indicating reliability of routes are added, the session management apparatus adds an additional header indicating reliability of a route between the session management apparatus and a next apparatus to the INVITE message, and sends the INVITE message to the next apparatus.

4. The session management apparatus as claimed in claim 3, wherein the first header includes an address of the first apparatus, and in response to receiving the first header, the session management apparatus determines validity of the first header by comparing an address included in the first header and an address of the first apparatus.

5. A method for transferring a message among a first apparatus, a session management apparatus and a second apparatus each connected to a network, the first apparatus and the second apparatus exchanging Session Initiation Protocol (SIP) messages via the session management apparatus to establish a connection, wherein:

the session management apparatus and the first apparatus exchange key information for encrypted communication and perform mutual authentication to establish a first encrypted communication channel between the session management apparatus and the first apparatus, and the session management apparatus stores a name of the first apparatus and identification information of the first encrypted communication channel in a storage device, wherein the name of the first apparatus is obtained from a REGISTER message sent by the first apparatus, and the name of the first apparatus and the identification information are associated with each other;

the session management apparatus and the second apparatus performs mutual communication to establish a second encrypted communication channel between the session management apparatus and the second apparatus;

the first apparatus sends an INVITE message including a name of the first apparatus via the first encrypted communication channel to the session management apparatus;

the session management apparatus determines whether the name included in the INVITE message is correct by comparing the name included in the INVITE message with the name, obtained from the REGISTER message, that is stored in the storage device and that is associated with the identification information of the first encrypted communication channel; and the session management apparatus sends the INVITE message to the second apparatus via the second encrypted communication channel.

6. A method for transferring a message among a first apparatus, a session management apparatus and a second apparatus each connected to a network, the first apparatus and the second apparatus exchanging Session Initiation Protocol (SIP) messages via the session management apparatus to establish a connection, wherein:

the session management apparatus and the first apparatus exchange key information for encrypted communication and perform mutual authentication to establish a first encrypted communication channel between the session management apparatus and the first apparatus;

the session management apparatus and the second apparatus perform mutual communication to establish a second encrypted communication channel between the session management apparatus and the second apparatus;

the first apparatus sends, to the session management apparatus via the first encrypted communication channel, an INVITE message including a first header indicating reliability of a route between the first apparatus and the session management apparatus; and the session management apparatus adds a second header indicating reliability of a route between the session management apparatus and the second apparatus to the INVITE message, and sends the INVITE message to the second apparatus via the second encrypted communication channel, wherein, when the session management apparatus receives, from another session management apparatus, an INVITE message to which headers indicating reliability of routes are added, the session management apparatus adds an additional header indicating reliability of a route between the session management apparatus and a next apparatus to the INVITE message, and sends the INVITE message to the next apparatus.

7. A non-transitory computer-readable medium including a computer program, which when executed by a computer causes the computer to function as a session management apparatus that can connect to a first apparatus and a second apparatus over a network, the first apparatus and the second apparatus exchanging Session Initiation Protocol (SIP) messages via the session management apparatus to establish a connection, the computer program comprising:

program code for exchanging key information for encrypted communication with the first apparatus and performing mutual authentication with the first apparatus to establish a first encrypted communication channel between the session management apparatus and the first apparatus, and storing a name of the first apparatus and identification information of the first encrypted communication channel in a storage device, wherein the name of the first apparatus is obtained from a REGISTER message sent by the first apparatus, and the name of the first apparatus and the identification information are associated with each other;

program code for establishing a second encrypted communication channel between the session management apparatus and the second apparatus based on mutual authentication with the second apparatus;

program code for receiving an invite message including a name of the first apparatus via the first encrypted communication channel;

program code for determining whether the name included in the INVITE message is correct by comparing the name included in the INVITE message with the name, obtained from the REGISTER message, that is stored in the storage device and that is associated with the identification information of the first encrypted communication channel; and program code for sending the INVITE message to the second apparatus via the second encrypted communication channel.

8. A non-transitory computer-readable medium including a computer program, which when executed by a computer causes the computer to function as a session management apparatus that can connect to a first apparatus and a second apparatus over a network, the first apparatus and the second apparatus exchanging Session Initiation Protocol (SIP) messages via the session management apparatus to establish a connection, the computer program comprising:

program code for exchanging key information for encrypted communication with the first apparatus and performing mutual authentication with the first apparatus to establish a first encrypted communication channel between the session management apparatus and the first apparatus;

program code for establishing a second encrypted communication channel between the session management apparatus and the second apparatus based on mutual authentication with the second apparatus;

program code for receiving, from the first apparatus via the first encrypted communication channel, an INVITE message including a first header indicating reliability of a route between the first apparatus and the session management apparatus;

program code for adding a second header indicating reliability of a route between the session management apparatus and the second apparatus to the INVITE message, and sending the INVITE message to the second apparatus via the second encrypted communication channel; and program code for, when the session management apparatus receives, from another session management apparatus, an INVITE message to which headers indicating reliability of routes are added, adding an additional header indicating reliability of a route between the session management apparatus and a next apparatus to the INVITE message, and sending the INVITE message to the next apparatus.

9. A method for establishing an encrypted communication channel between a first apparatus and a second apparatus, and performing communication between the second apparatus and a third apparatus using the encrypted communication channel, comprising:
- a first step of exchanging key information for encrypted communication and performing mutual authentication between a session management apparatus and the second apparatus so as to establish a second encrypted communication channel between the session management apparatus and the second apparatus;
- a second step in which the first apparatus is accessed by the third apparatus;
- a third step of exchanging key information for encrypted communication and performing mutual authentication between the session management apparatus and the first apparatus so as to establish a first encrypted communication channel between the session management apparatus and the first apparatus;
- a fourth step in which the first apparatus sends, to the session management apparatus via the first encrypted communication channel, a connection request message destined for the second apparatus including key information used for encrypted communication between the first apparatus and the second apparatus, and the session management apparatus sends the connection request message to the second apparatus via the second encrypted communication channel;
- a fifth step in which the second apparatus sends, to the session management apparatus via the second encrypted communication channel, a response message including key information used for encrypted communication between the first apparatus and the second apparatus in response to receiving the connection request message, and the session management apparatus sends the response message to the first apparatus via the first encrypted communication channel;
- a sixth step in which the first apparatus receives data from the second apparatus via the encrypted communication channel established between the first apparatus and the second apparatus, and sends the data to the third apparatus,
- wherein the first apparatus is provided with a table including at least one connection destination permitted for the third apparatus, and the first apparatus sends information of the at least one connection destination to the third apparatus in response to receiving access from the third apparatus, and receives a connection destination from the third apparatus so as to send the connection request message destined for the second apparatus to the session management apparatus in the fourth step based on the connection destination received from the third apparatus.

10. The method as claimed in claim 9, wherein the session management apparatus has information for determining whether connection is permitted between apparatuses,
- when the session management apparatus receives a connection request message destined for an apparatus of a connection request destination from an apparatus of a connection request source, the session management apparatus determines whether connection between the apparatus of the connection request destination and the apparatus of the connection request source is permitted by referring to the information, and
- if the connection is permitted, the session management apparatus sends the connection request message to the apparatus of the connection request destination, and if the connection is not permitted, the session management apparatus rejects the connection without sending the connection request message to the apparatus of the connection request destination.

11. A method for establishing an encrypted communication channel between a first apparatus and a second apparatus, and performing communication between the second apparatus and a third apparatus using the encrypted communication channel, comprising:
- a first step of exchanging key information for encrypted communication and performing mutual authentication between a session management apparatus and the first apparatus so as to establish a first encrypted communication channel between the session management apparatus and the first apparatus;
- a second step of exchanging key information for encrypted communication and performing mutual authentication between the session management apparatus and the second apparatus so as to establish a second encrypted communication channel between the session management apparatus and the second apparatus;
- a third step in which the first apparatus is accessed by the third apparatus;
- a fourth step in which the first apparatus sends, to the session management apparatus via the first encrypted communication channel, a connection request message destined for the second apparatus including key information used for encrypted communication between the first apparatus and the second apparatus, and the session management apparatus sends the connection request message to the second apparatus via the second encrypted communication channel;
- a fifth step in which the second apparatus sends, to the session management apparatus via the second encrypted communication channel, a response message including key information used for encrypted communication between the first apparatus and the second apparatus in response to receiving the connection request message, and the session management apparatus sends the response message the first apparatus via the first encrypted communication channel;
- a sixth step in which the first apparatus receives data from the second apparatus via the encrypted communication channel established between the first apparatus and the second apparatus, and sends the data to the third apparatus,
- wherein the first apparatus is provided with a table including at least one connection destination permitted for the third apparatus, and the first apparatus sends information of the at least one connection destination to the third apparatus in response to receiving access from the third apparatus, and receives a connection destination from the third apparatus so as to send the connection request message destined for the second apparatus to the session management apparatus in the fourth step based on the connection destination received from the third apparatus.

12. The method as claimed in claim 11, wherein the session management apparatus has information for determining whether connection is permitted between apparatuses, when the session management apparatus receives a connection request message destined for an apparatus of a connection request destination from an apparatus of a connection request source, the session management apparatus determines whether connection between the apparatus of the connection request destination and the apparatus of the connection request source is permitted by referring to the information, and if the connection is permitted, the session management apparatus sends the connection request message to the apparatus of the connection request destination, and if the connection is not permitted, the session management apparatus rejects the connection without sending the connection request message to the apparatus of the connection request destination.

13. An apparatus that establishes an encrypted communication channel to a second apparatus by using a session management apparatus, the apparatus comprising:

a first part configured to exchange key information for encrypted communication with the session management apparatus, perform mutual authentication with the session management apparatus so as to establish an encrypted communication channel between the apparatus and the session management apparatus;

a second part configured to send, to the session management apparatus via the encrypted communication channel, a connection request message including key information for encrypted communication between the apparatus and the second apparatus, and receive, from the second apparatus via the session management apparatus, a response message including key information for encrypted communication between the apparatus and the second apparatus so as to establish an encrypted communication channel between the apparatus and the second apparatus;

a part configured to perform, after being accessed by a third apparatus, processing by the first part for establishing the encrypted communication channel between the apparatus and the session management apparatus, and processing by the second part for establishing the encrypted communication channel between the apparatus and the second apparatus, and receive data from the second apparatus via the encrypted communication channel established between the apparatus and the second apparatus, and send the data to the third apparatus;

a table including at least one connection destination permitted for the third apparatus; and a part configured to send information of the at least one connection destination to the third apparatus in response to receiving access from the third apparatus, and receive a connection destination from the third apparatus, wherein the second part sends the connection request message destined for the second apparatus to the session management apparatus based on the connection destination received from the third apparatus.

14. An apparatus that establishes an encrypted communication channel to a second apparatus by using a session management apparatus, the apparatus comprising:

a first part configured to exchange key information for encrypted communication with the session management apparatus, perform mutual authentication with the session management apparatus so as to establish an encrypted communication channel between the apparatus and the session management apparatus;

a second part configured to send, to the session management apparatus via the encrypted communication channel, a connection request message including key information for encrypted communication between the apparatus and the second apparatus, and receive, from the second apparatus via the session management apparatus, a response message including key information for encrypted communication between the apparatus and the second apparatus so as to establish an encrypted communication channel between the apparatus and the second apparatus;

a part configured to perform, after being accessed by a third apparatus, processing by the second part for establishing the encrypted communication channel between the apparatus and the second apparatus, and receive data from the second apparatus via the encrypted communication channel established between the apparatus and the second apparatus, and send the data to the third apparatus;

a table including at least one connection destination permitted for the third apparatus; and a part configured to send information of the at least one connection destination to the third apparatus in response to receiving access from the third apparatus, and receive a connection destination from the third apparatus, wherein the second part sends the connection request message destined for the second apparatus to the session management apparatus based on the connection destination received from the third apparatus.

15. A non-transitory computer-readable medium including computer program instructions, which when executed by an apparatus, cause the apparatus to perform a method of establishing an encrypted communication channel to a second apparatus by using a session management apparatus, the method comprising:

exchanging key information for encrypted communication with the session management apparatus;

performing mutual authentication with the session management apparatus so as to establish an encrypted communication channel between the apparatus and the session management apparatus;

sending, to the session management apparatus via the encrypted communication channel, a connection request message including key information for encrypted communication between the apparatus and the second apparatus;

receiving, from the second apparatus via the session management apparatus, a response message including key information for encrypted communication between the apparatus and the second apparatus so as to establish an encrypted communication channel between the apparatus and the second apparatus;

establishing, after being accessed by a third apparatus, the encrypted communication channel between the apparatus and the session management apparatus;

establishing the encrypted communication channel between the apparatus and the second apparatus;

receiving data from the second apparatus via the encrypted communication channel established between the apparatus and the second apparatus;

sending the data to the third apparatus;

storing at least one connection destination permitted for the third apparatus;

sending information of the at least one connection destination to the third apparatus in response to receiving access from the third apparatus;

receiving a connection destination from the third apparatus; and sending the connection request message destined for the second apparatus to the session management apparatus based on the connection destination received from the third apparatus.

16. A non-transitory computer-readable medium including computer program instructions, which when executed by an apparatus, cause the apparatus to perform a method of establishing an encrypted communication channel to a second apparatus by using a session management apparatus, the method comprising:

exchanging key information for encrypted communication with the session management apparatus;

performing mutual authentication with the session management apparatus so as to establish an encrypted communication channel between the apparatus and the session management apparatus;

sending, to the session management apparatus via the encrypted communication channel, a connection request message including key information for encrypted communication between the apparatus and the second apparatus;

receiving, from the second apparatus via the session management apparatus, a response message including key information for encrypted communication between the apparatus and the second apparatus to establish an encrypted communication channel between the apparatus and the second apparatus;

establishing the encrypted communication channel between the apparatus and the second apparatus;

receiving data from the second apparatus via the encrypted communication channel established between the apparatus and the second apparatus;

sending the data to the third apparatus;

storing at least one connection destination permitted for the third apparatus;

sending information of the at least one connection destination to the third apparatus in response to receiving access from the third apparatus;

receiving a connection destination from the third apparatus; and sending the connection request message destined for the second apparatus to the session management apparatus based on the connection destination received from the third apparatus.

* * * * *